United States Patent
Nakayauchi et al.

(10) Patent No.: US 8,594,163 B2
(45) Date of Patent: Nov. 26, 2013

(54) MOBILE TERMINAL, METHOD OF CONTROLLING MOBILE TERMINAL AND CONTROL APPARATUS

(75) Inventors: Natsuhiko Nakayauchi, Kawasaki (JP); Makoto Kurimoto, Kawasaki (JP); Shinsuke Okazoe, Kawasaki (JP); Takashi Satou, Kawasaki (JP); Yuji Hosokawa, Kawasaki (JP); Yoji Sugawara, Kawasaki (JP); Tetsuya Oki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 371 days.

(21) Appl. No.: 12/917,893

(22) Filed: Nov. 2, 2010

(65) Prior Publication Data

US 2011/0103442 A1 May 5, 2011

(30) Foreign Application Priority Data

Nov. 5, 2009 (JP) ................................ 2009-254209

(51) Int. Cl.
*H04B 1/38* (2006.01)
(52) U.S. Cl.
USPC ........................................................ 375/222
(58) Field of Classification Search
USPC .................................. 375/219, 222, 220, 295
See application file for complete search history.

(56) References Cited

U.S. PATENT DOCUMENTS 6,389,059 B1 * 5/2002 Smith et al. ................... 375/141

FOREIGN PATENT DOCUMENTS

| JP | 2006-157546 A | 6/2006 |
| JP | 2007-529920 A | 10/2007 |
| WO | WO-2005/089249 | 9/2005 |

* cited by examiner

*Primary Examiner* — Kevin Kim
(74) *Attorney, Agent, or Firm* — Fujitsu Patent Center

(57) ABSTRACT

A mobile terminal has a communication unit for performing wireless communication, a plurality of modem units for performing modulation and demodulation in different communication methods, respectively, and a control unit for obtaining time information indicating a suspension of a wireless communication from a main modem unit in the plurality of modem units, for suspending the main modem unit from performing wireless communication via the communication unit, and for enabling the main modem unit to perform wireless communication via the communication unit on the basis of the time information, wherein, while the main modem unit suspending wireless communication, the control unit enables a sub modem unit in the plurality of modem units to measure a reception level via the communication unit in accordance with the obtained time information.

12 Claims, 14 Drawing Sheets

US 8,594,163 B2

MOBILE TERMINAL, METHOD OF CONTROLLING MOBILE TERMINAL AND CONTROL APPARATUS

CROSS-REFERENCE TO RELATED APPLICATION

This application is based upon and claims the benefit of priority of the prior Japanese Patent Application No. 2009-254209, filed on Nov. 5, 2009, the entire contents of which are incorporated herein by reference.

FIELD

The present art relates to a mobile terminal, a method of controlling the mobile terminal, and a control apparatus.

BACKGROUND

A mobile terminal of related art includes a plurality of radio access technology (RAT) modules different from each other in wireless communication method and sharing a common antenna. Such a mobile terminal causes each RAT module (hereinafter simply referred to as RAT) to measure a reception level and assigns the antenna to a RAT providing high wireless communication quality. The RAT having the antenna assigned thereto performs wireless communications using the wireless communication method applied to the RAT.

The mobile terminal causes each BAT to measure a reception level as appropriate because the reception level of each RAT varies depending on a position of the mobile terminal. The RAT in operation may temporarily suspends wireless communications. During the communication suspension time band of the wireless communication active RAT, the mobile terminal causes another RAT to measure the reception level, and compares wireless communication qualities of the RATs.

More specifically, the mobile terminal causes the other RAT to acquire information of the communication suspension time band of the wireless communication active RAT. During the communication suspension time band of the wireless communication active RAT, the mobile terminal assigns the antenna to the other RAT, thereby causing the other RAT to measure the reception level. The mobile terminal then compares the communication qualities of the RATs.

Reference is made to Japanese Laid-open Patent Publication No. 2006-157546 for the above-described related art technique.

SUMMARY

According to an aspect of an embodiment, a mobile terminal has a communication unit for performing wireless communication, a plurality of modem units for performing modulation and demodulation in different communication methods, respectively, and a control unit for obtaining time information indicating a suspension of a wireless communication from a main modem unit in the plurality of modem units, for suspending the main modem unit from performing wireless communication via the communication unit, and for enabling the main modem unit to perform wireless communication via the communication unit on the basis of the time information, wherein, while the main modem unit suspending wireless communication, the control unit enables a sub modem unit in the plurality of modem units to measure a reception level via the communication unit in accordance with the obtained time information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 13:
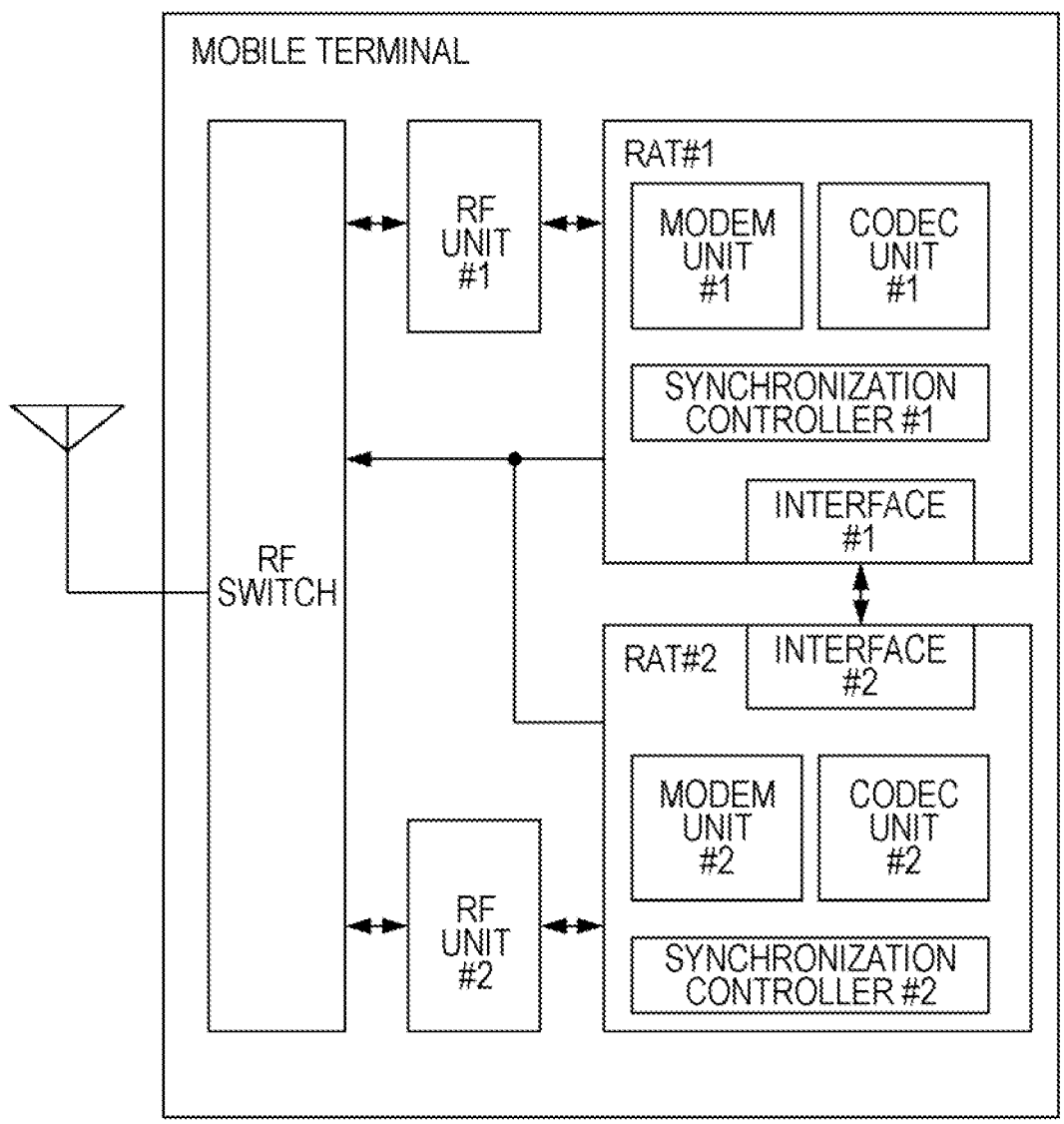
FIG. 13 is a diagram (1) illustrating a related art technique.

As illustrated in FIG. 13, a method of the mobile terminal for causing the RAT to perform wireless communications is described. FIG. 13 is a diagram (1) illustrating a related art technique. Referring to FIG. 13, the mobile terminal includes two RATs, one antenna, two radio frequency (RF) units that the two RATs respectively use for wireless communications, and an RF switch that assigns the antenna to one of the RATs. Each RAT includes a modem unit modulating or demodulating a radiowave signal received by the antenna, a codec unit coding or decoding information, a synchronization controller controlling synchronization between the RATs, and an interface connecting the two RATs. Each RAT performing modulation and demodulation.

If wireless communications are performed using a wireless communication method supported by the RAT #1, the mobile terminal assigns the antenna to the RF unit #1. The RAT #1 performs wireless communications with a base station using the wireless communication method supported thereby. The RAT #2, having no antenna assigned thereto, does not performs wireless communication and waits on standby.

Referring to FIG. 13, methods of causing a standby RAT to acquire the information of the wireless communication suspension time band are described. In one method, the wireless communication active RAT notifies the standby RAT of the wireless communication suspension time band, and in another method, the standby RAT calculates the wireless communication suspension time band. In the discussion that follows, the RAT #1 is active and the RAT #2 is on standby.

The method in which the wireless communication active RAT notifies the standby RAT of the wireless communication suspension time band is described first. The active RAT #1 notifies the standby RAT #2 and the RF switch of the wireless communication suspension time via the interface #1. The RF switch assigns the antenna to the RF unit #2 during the notified time band. The RAT #2 then measures the reception level via the RF unit #2 during the time band of which the RAT #1 has notified the RAT #2.

The method in which the standby RAT calculates the time band of the wireless communication suspension is described. For example, the standby RAT #2 has an algorithm to calculate the wireless communication suspension time band of the active RAT #1. The RAT #2 calculates the wireless communication suspension time band of the RAT #1 and notifies the RF switch of the calculated time band. The RF unit assigns the antenna to the RF unit #2 during the notified time band. Through the RF unit #2, the RAT #2 measure the reception level during the calculated time band.

To perform the method of notifying the standby RAT of the wireless communication suspension time band, one RAT in the mobile terminal needs an interface to communicate with each of the other RATs. This arrangement impairs independency of each RAT. When a new RAT is added, the new RAT needs an interface to each of all the existing RATs in the mobile terminal. Expandability of the mobile terminal is thus reduced.

Figure 14:
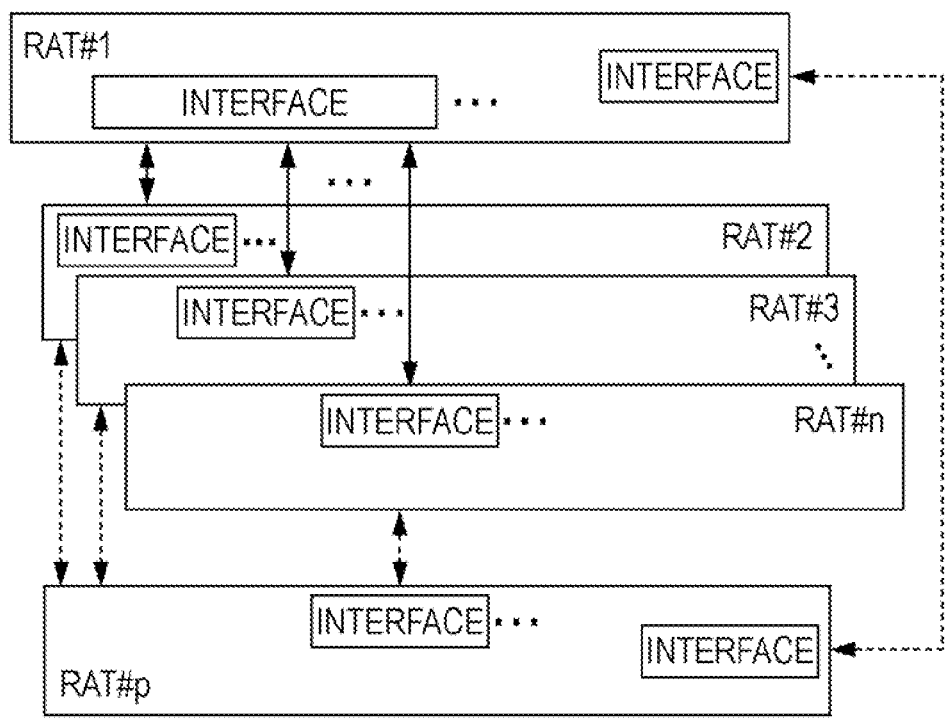
FIG. 14 is a diagram (2) illustrating a related art technique.

The method of notifying the standby RAT of the wireless communication suspension time band impairs independency of each RAT and provides low system expandability. This problem is discussed with reference to FIG. 14. FIG. 14 is a diagram (2) of the related art technique. The mobile terminal in FIG. 14 includes n RATs. In the mobile terminal, one of the RATs #1-#n needs an interface to communication with each of the other RATs #1-#n. As a result, independency of each RAT is impaired. More specifically, impaired independency of RATs in the mobile terminal makes it difficult to develop and design the RATs separately from each other. If a new RAT #p is added to the mobile terminal, the new RAT #p needs interfaces with all the RATs #1-#n. Expandability of the mobile terminal is thus limited. Low expandability of the mobile terminal makes it difficult to add a new RAT.

In the other method in which the standby RAT calculates the wireless communication suspension time band, the mobile terminal has the algorithm to calculate the wireless communication suspension time band of each of the other RATs. Independency of each RAT is this impaired. When a new RAT is added, the mobile terminal needs an algorithm that causes the new RAT to calculate the wireless communication suspension time band of each of the other RATs. System expandability becomes low.

Figure 15:
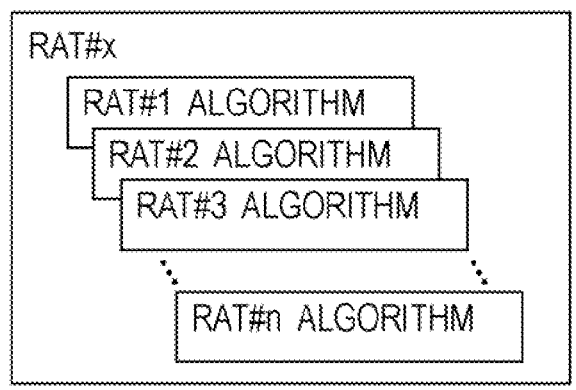
FIG. 15 is a diagram (3) illustrating a related art technique.

The method in which the standby RAT calculates the wireless communication suspension time band impairs independency of each RAT and provides low system expandability. This problem is discussed with reference to FIG. 15. FIG. 15 is a diagram (3) of the related art technique. Referring to FIG. 15, the mobile terminal includes n RATs. Each of the RATs #1-#n in the mobile terminal having an algorithm to calculate the wireless communication suspension time bands of the other RATs #1-#n calculates the wireless communication suspension time bands of the other RATs #1-#n. Independency of the RAT is thus impaired. Impaired independency of the RATs in the mobile terminal makes it difficult to develop and design the RATs separately from each other. If a new RAT #x is added to the mobile terminal, the new RAT #x needs an algorithm to calculate the wireless communication suspension time bands of all the other RAT #1-#n. Expandability is thus low. Low expandability makes it difficult to add a new RAT onto the mobile terminal.

A mobile terminal, a communication control method, and a control apparatus related to the application are described below with reference to the accompanying drawings.

First Embodiment

A mobile terminal 6 as a first embodiment is described below. The mobile terminal 6 may be a cellular wireless terminal, for example. The mobile terminal 6 is a mobile communication terminal having at least a plurality of wireless communication units.

Figure 1:
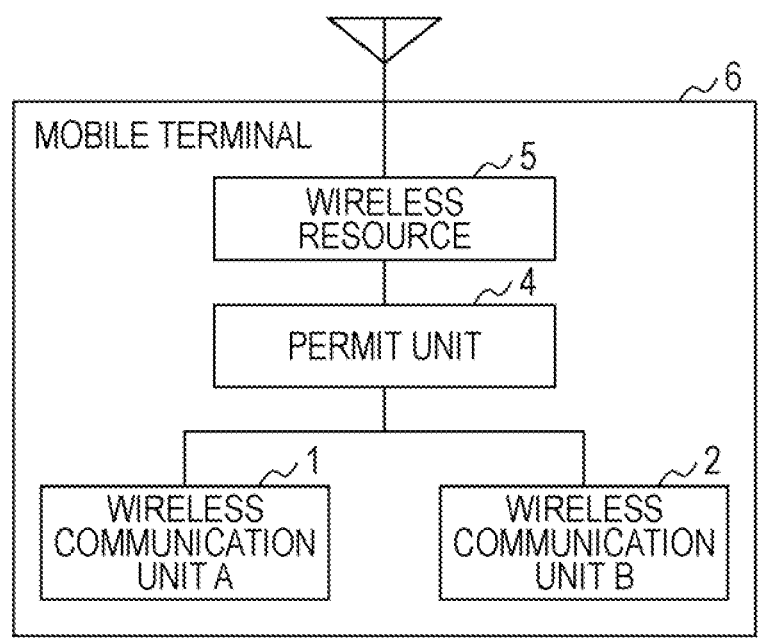
FIG. 1 is a block diagram illustrating a mobile terminal of a first embodiment.

Referring to FIG. 1, the mobile terminal 6 of the first embodiment and a process thereof are discussed. FIG. 1 is a block diagram illustrating the mobile terminal 6 of the first embodiment.

The mobile terminal 6 includes wireless communication unit A 1, wireless communication unit B 2, permit unit 4, and wireless resource 5. The wireless communication unit A 1 and the wireless communication unit B 2 perform wireless communications in different communication methods. The wireless resource 5 is needed for each of the wireless communication units 1 and 2 to perform wireless communications. If information regarding the wireless communication suspension time band is received from an active wireless communication unit, the permit unit 4 permits a standby wireless communication unit to use the wireless resource 5 during the wireless communication suspension time band, and then causes the standby wireless communication unit to measure a reception level.

As described above, the mobile terminal 6 of the first embodiment causes the permit unit 4 different from the wireless communication units 1 and 2 to acquire the information of the wireless communication suspension time band of the active wireless communication unit. The permit unit 4 then permits the standby wireless communication unit to use the wireless resource 5 during the time band, and causes the standby wireless communication unit to measure the reception level. The mobile terminal 6 is thus free from the need of an interface between the wireless communication units 1 and 2, and an algorithm to calculate the wireless communication suspension time band. During the wireless communication suspension time band of one wireless communication unit, the mobile terminal 6 can cause the other wireless communication unit to acquire the reception level. As a result, the arrangement of the mobile terminal 6 increases expandability of the mobile terminal having a plurality of RATs. Since the mobile terminal 6 assures independency of each of the wireless communication units 1 and 2, the wireless communication units 1 and 2 can be designed and developed independently with ease. Since expandability is assured, a new RAT can be easily added.

Second Embodiment

Figure 2:
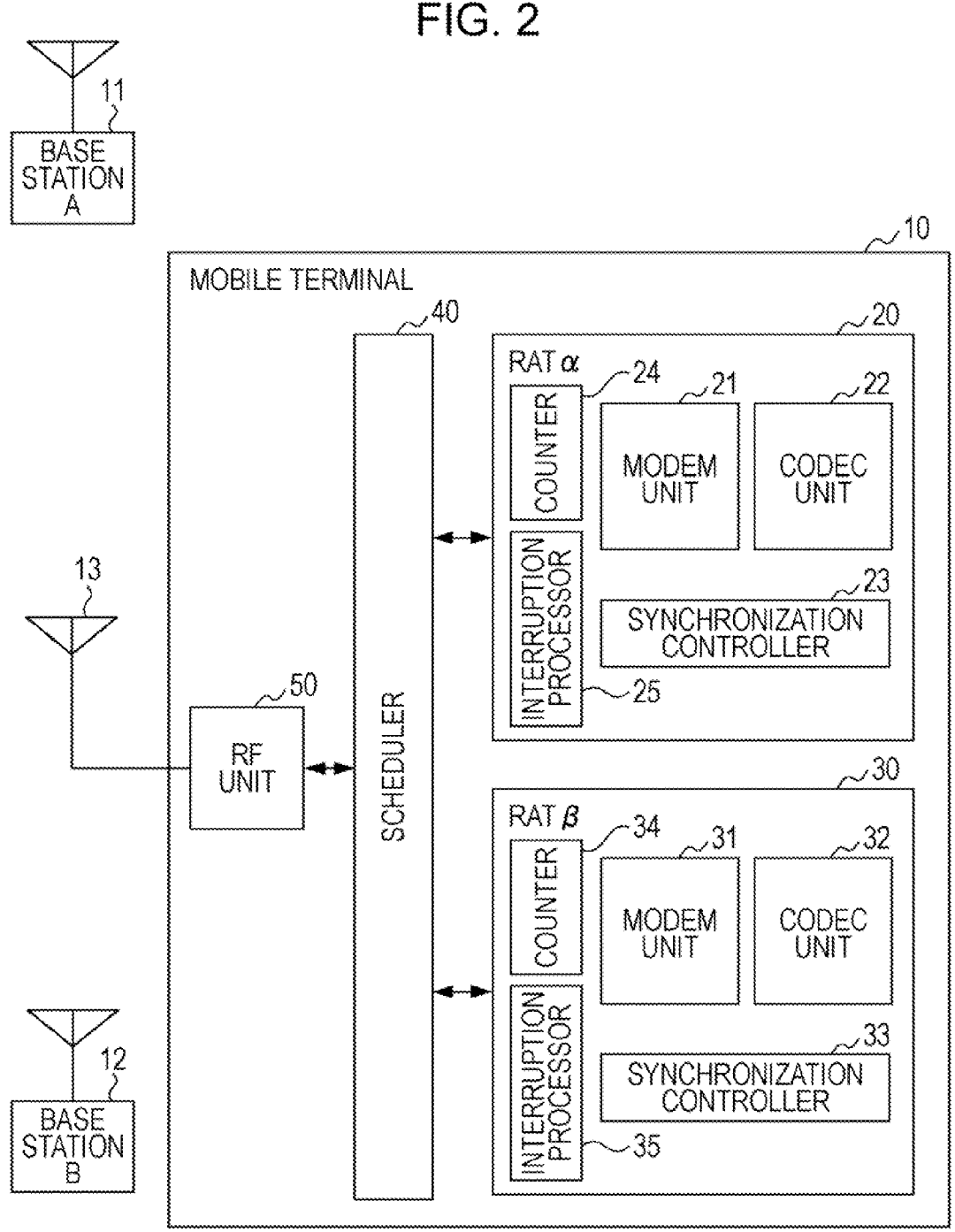
FIG. 2 illustrates a mobile terminal of a second embodiment.

The mobile terminal 10 of a second embodiment is described below with reference to FIG. 2. FIG. 2 illustrates the mobile terminal 10 of the second embodiment.

Mobile Terminal:

Elements of the mobile terminal 10 are described with reference to FIG. 2. Referring to FIG. 2, the mobile terminal 10 includes radio access technology (radio access technology (RAT))α 20 (wireless communication unit A), RATβ 30

(wireless communication unit B), scheduler 40 (permit unit), radio frequency (RF) unit 50 (wireless resource), and antenna 13.

The RF unit 50 is a wireless resource working with each of the RATs 20 and 30 to perform wireless communications, and exchanges signals. More specifically, the RF unit 50 transfers a signal received by the antenna 13 to one of a modem unit 21 and a modem unit 31. The RF unit 50 transmits a signal transferred from one of the modem unit 21 and the modem unit 31 to a base station A 11 or a base station B 12 via the antenna 13.

The antenna 13 receives and transmits radiowaves to and from one of the base station A 11 and the base station B 12. The antenna 13 is a wireless resource used for each of the RATs 20 and 30 to perform wireless communications.

The RATα 20 performs wireless communications in a communication method different from a communication method of the RATβ 30. For example, the communication methods may include Global System for Mobile Communications/General Packet Radio Service (GSM/GPRS), Wideband Code Division Multiple Access (W-CDMA), Long Term Evolution (LTE).

More specifically, the RATα 20 performs wireless communications with the base station A 11 in a communication method applied thereto. To suspend wireless communications temporarily, the RATα 20 transfers to the scheduler 40 information of a wireless communication suspension time band. The phrase "To suspend wireless communications temporarily" refers to a compressed mode in W-CDMA or an idle frame in GSM, for example.

To measure a reception level, the RATα 20 requests the scheduler 40 to assign the RF unit 50 thereto. Also, upon receiving an interruption signal from the scheduler 40, the RATα 20 measures the reception level via the antenna 13. Upon receiving an interruption signal again from the scheduler 40, the RATα 20 ends the measurement of the reception level.

The interruption signal is a pulse signal representing the start timing of wireless communications or the end timing of wireless communications. The interruption signal is generated by the pulse generator 45 to be discussed later.

The RATβ 30 performs wireless communications in a communication method different from the communication method of the RATα 20. More specifically, the RATβ 30 communicates with the base station B 12 in the communication method applied thereto. To suspend wireless communications temporarily, the RATβ 30 transfers to the scheduler 40 information of the wireless communication suspension time band.

To measure the reception level, the RATβ 30 requests the scheduler 40 to assign the RF unit 50 thereto. Upon receiving an interruption signal from the scheduler 40, the RATβ 30 measures a reception level via the antenna 13. Upon receiving an interruption signal again from the scheduler 40, the RATβ 30 ends the measurement of the reception level.

The scheduler 40 may retrieve the information of the wireless communication suspension time band from a wireless communication active RAT. The scheduler 40 then permits a wireless communication standby RAT to use the wireless resource during the wireless communication suspension time band and causes the wireless communication standby RAT to measure the reception level. More specifically, the scheduler 40 retrieves the information of the wireless communication suspension time band from the wireless communication active RAT using the wireless resource. If the information of the wireless communication suspension time band is retrieved, the scheduler 40 assigns the wireless resource to the wireless communication standby RAT during the wireless communication suspension time band.

The scheduler 40 transfers an interruption signal to the RAT assigned to the wireless resource, and causes the RAT to measure the reception level. To resume wireless communications, the scheduler 40 transfers an interruption signal to the RAT measuring the reception level, and causes the RAT to end the measurement of the reception level.

A process of the scheduler 40 is described below. In the discussion that follows, the RATα 20 is a wireless communication active RAT having the RF unit 50 assigned thereto and the RATβ 30 is a standby RAT having no RF unit 50 assigned thereto.

The scheduler 40 acquires the information of the wireless communication suspension time band from the RATα 20. Upon receiving the wireless communication suspension time band from the RATα 20, the scheduler 40 re-assigns the RF unit 50, which has been assigned to the RATα 20, to the RATβ 30 during the wireless communication suspension time band of the RATα 20.

During the wireless communication suspension time band of the RATα 20, the scheduler 40 transfers an interruption signal to the RATβ 30 to cause the RATβ 30 to measure the reception level. When the wireless communication suspension time band of the RATα 20 has elapsed, the scheduler 40 transfers an interruption signal again.

The elements of the RATα 20 and the RATβ 30 are described below. The RATα 20 includes modem unit 21, codec unit 22, synchronization controller 23, counter 24, and interruption processor 25. Similarly, the RATβ 30 includes modem unit 31, codec unit 32, synchronization controller 33, counter 34, and interruption processor 35. The elements 21-25 of the RATα 20 perform processes respectively identical to those of the elements 31-35 of the RATβ 30. The processes of the elements 21-25 of the RATα 20 are described below, and the discussion of the processes of elements 31-35 of the RATβ 30 is thus omitted here.

The codec unit 22 encodes a signal to be transmitted to the base station A 11. The codec unit 22 also decodes a signal received from the base station A 11. The modem unit 21 modulates the signal to be transmitted to the base station A 11. The modem unit 31 also demodulates the signal received from the base station A 11.

The counter 24 generates a synchronization signal serving as a clock for the RATα 20. More specifically, the counter 24 transfers the generated synchronization signal to the scheduler 40.

When the RATα 20 suspends temporarily wireless communications, the synchronization controller 23 transfers the information of the wireless communication suspension time band of the RATα 20 to the scheduler 40. More specifically, the synchronization controller 23 transfers to the scheduler 40 the information of the wireless communication suspension time band, RF setting information of the RATα 20, and information indicating measurement period use application. If the RATα 20 measures the reception level, the synchronization controller 23 transfers to the scheduler 40 the information indicating the measurement target and the RF setting information in order to request the scheduler 40 assign to the RF unit 50 thereto.

The process of the synchronization controller 23 is described in detail. When the RATα 20 suspends temporarily wireless communications, the synchronization controller 23 generates the information of the wireless communication suspension time band, the RF setting information of the RATα 20, and the information indicating the measurement period use application. The synchronization controller 23 then transfers to the scheduler 40 the information of the wireless communication suspension time band, the RF setting information of the RATα 20, and the information indicating the measurement period use application.

The information of the wireless communication suspension time band represents a time band through which the RATα 20 suspends temporarily wireless communications. The RF setting information is stored on the RF unit 50 such that the RATα 20 performs wireless communications using the RF unit 50. For example, the RF setting information indicates a frequency of a radiowave used in the wireless communication method applied to the RATα 20. The information indicating the measurement period use application specifies a purpose of wireless communications performed by another RAT. For example, the synchronization controller 23 transfers to the scheduler 40, as the measurement period use application information, information indicating a measurement of the reception level by the RAT to which W-CDMA is applied.

When the RATα 20 measures the reception level, the synchronization controller 23 transfers the information indicating the measurement target and the RF setting information to the scheduler 40 to request the scheduler 40 to assign the RF unit 50. The information indicating the measurement target indicates the purpose of wireless communications. For example, the information indicating the measurement target indicates the measurement of the reception level by the RAT to which W-CDMA is applied. For example, when the RATα 20 measures the reception level, the synchronization controller 23 transfers to the scheduler 40 the information indicating the measurement of the reception level as the measurement target information and the RF setting information related to the RATα 20.

In response to the reception of the interruption signal, the interruption processor 25 measures the reception level using the modem unit 21. More specifically, the interruption processor 25 measures the reception level using the modem unit 21 if the interruption signal is acquired from the scheduler 40. For example, if the interruption signal is acquired from the scheduler 40, the interruption processor 25 retrieves from the scheduler 40 measurement period information to be discussed later. The interruption processor 25 also acquires TX (transmission)/RX (reception) signals from a base station using the modem unit 21 and measures the reception signal in response to the acquired TX/RX signals and the retrieved measurement period information.

If the interruption signal is received again, the interruption processor 25 ends the measurement of the reception signal. The measurement period information is used as a parameter for measuring the reception signal, and includes the wireless communication suspension time band, the RF setting information, and the information indicating the measurement period use application. For example, the measurement period information includes an average transmission and reception count as a parameter for measuring the reception level.

Figure 3:
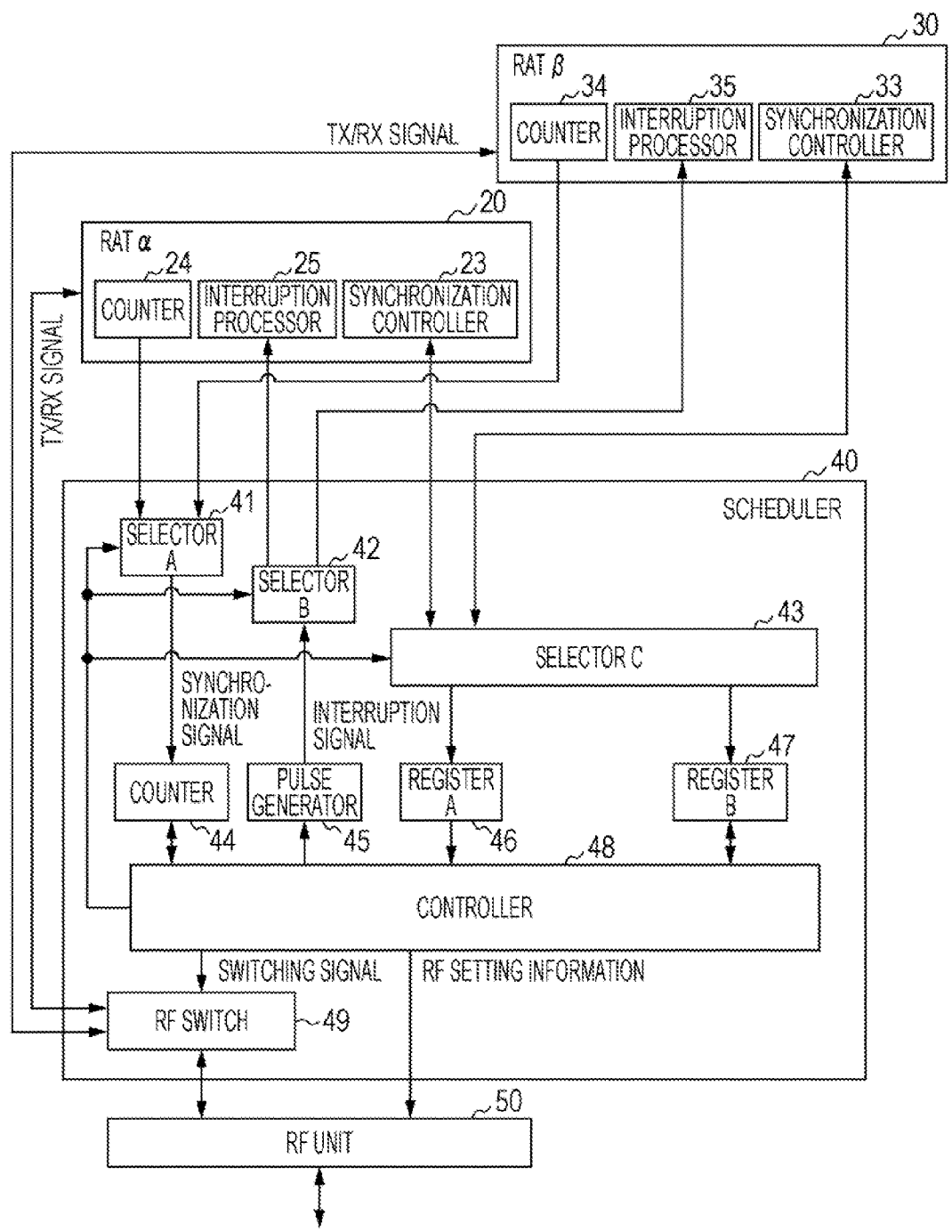
FIG. 3 illustrates a structure of a scheduler.

Scheduler:

The elements of the scheduler 40 are described below with reference to FIG. 3. FIG. 3 illustrates a structure of the scheduler 40. Referring to FIG. 3, the scheduler 40 includes selector A 41, selector B 42, selector C 43, counter 44, pulse generator 45, register A 46, register B 47, controller 48, and RF switch 49.

The selector A 41 is connected to the counter 24 in the RATα 20, the counter 34 in the RATβ 30, the counter 44, and the controller 48. The selector B 42 is connected to the interruption processor 25 in the RATα 20, the interruption processor 35 in the RATβ 30, the pulse generator 45, and the controller 48. The selector C 43 is connected to the synchronization controller 23 in the RATα 20, the synchronization controller 33 in the RATβ 30, the register A 46, the register B 47, and the controller 48. The controller 48 is connected to the counter 44, the pulse generator 45, the register A 46, the register B 47, the RF switch 49, and the RF unit 50.

The selector A 41 receives a synchronization signal transferred from the counter in a wireless communication active RAT, and transfers the received synchronization signal to the counter 44. More specifically, the selector A 41 receives the synchronization signals transferred from the counter 24 in the RATα 20 and the counter 34 in the RATβ 30. The selector A 41 then receives from the controller 48 a notification indicating a RAT selected by the controller 48. The selector A 41 transfers to the counter 44 of the scheduler 40 the synchronization signal transferred from the RAT selected by the controller 48.

If the RATα 20 is selected by the controller 48, the selector A 41 receives from the controller 48 a notification indicating the RATα 20. Upon receiving the notification indicating the RATα 20, the selector A 41 transfers to the counter 44 in the scheduler 40 the synchronization signal transferred from the counter 24 in the RATα 20.

The selector B 42 transfers to the interruption processor in a standby RAT the interruption signal generated by the pulse generator 45 in the scheduler 40. More specifically, the selector B 42 receives from the controller 48 a notification indicating the RAT selected by the controller 48. The selector B 42 transfers the interruption signal to the interruption processor in the RAT selected by the controller 48.

If the RATβ 30 is selected by the controller 48, the selector B 42 receives a notification indicating the RATβ 30. Upon receiving the notification indicating the RATβ 30, the selector B 42 transfers to the interruption processor 35 in the RATβ 30 the interruption signal received from the pulse generator 45.

The selector C 43 receives information transferred from the synchronization controller in the wireless communication active RAT, and transfers the received information to the register A 46. The selector C 43 receives information transferred from the synchronization controller in the standby RAT, and transfers the received information to the register B 47 in the scheduler 40.

More specifically, the selector C 43 receives from the controller 48 the notifications indicating the wireless communication active RAT and the standby RAT. The selector C 43 also receives the information of the wireless communication suspension time band, the RF setting information, and the information indicating the measurement period use application transferred from the synchronization controller in the wireless communication active RAT, and transfers the received information to the register A 46 in the scheduler 40. The selector C 43 also receives the information indicating the measurement target and the RF setting information transferred from the synchronization controller in the standby RAT, and transfers the received information to the register B 47 in the scheduler 40.

If the RATα 20 is selected as a wireless communication active RAT by the controller 48, the selector C 43 receives from the controller 48 a notification indicating that the wireless communication active RAT is the RATα 20. When the notification that the wireless communication active RAT is the RATα 20 is received, the selector C 43 receives the information of the wireless communication suspension time band, the RF setting information of the RATα 20, and the information indicating the measurement period use application transferred from the synchronization controller 23 in the RATα 20.

The selector C 43 then transfers the received information to the register A 46 in the scheduler 40.

If the RATβ 30 is selected as the standby RAT by the controller 48, the selector C 43 receives from the controller 48 a notification indicating that the standby RAT is the RATβ 30. When the notification that the standby RAT is the RATβ 30 is received, the selector C 43 receives the information indicating the measurement target and the RF setting information of the RATβ 30 transferred from the synchronization controller 33 in the RATβ 30. The selector C 43 then transfers the received information to the register B 47 in the scheduler 40.

The counter 44 receives the synchronization signal via the selector A 41, and establishes synchronization with the counter having transferred the synchronization signal, in response to the received synchronization signal. The controller 48 sets timer time on the counter 44, and when the timer time is reached, the counter 44 notifies the controller 48 that the set time is reached.

The process of the counter 44 is specifically described. The counter 44 receives the synchronization signal transferred from the selector A 41, and establishes synchronization with the RAT having transferred the synchronization signal in accordance with the received synchronization signal. More specifically, the counter 44 receives via the selector A 41 the synchronization signal transferred from the counter in the RAT to which the antenna 13 is assigned. In response to the received synchronization signal, the counter 44 establishes synchronization with the counter in the RAT to which the antenna 13 is assigned.

If the RAT having the antenna 13 assigned thereto is the RATα 20, the counter 44 receives via the selector A 41 the synchronization signal transferred from the counter 24 in the RATα 20. Using the received synchronization signal, the counter 44 synchronizes with the counter 24 in the RATα 20.

When the timer time set on the counter 44 by the controller 48 is reached, the counter 44 so notifies the controller 48. For example, if five seconds of timer time is set on the counter 44 by the controller 48, the counter 44 immediately starts subtracting on the remaining time. At the 5 seconds after the timer setting, the counter 44 notifies the controller 48 of the timer out.

If the controller 48 issues a generation instruction of the interruption signal to the pulse generator 45, the pulse generator 45 transfers the generated interruption signal to the selector B 42. More specifically, upon receiving the generation instruction of the interruption signal from the controller 48, the pulse generator 45 generates a pulse signal as the interruption signal and transfers the generated pulse signal to the selector B 42.

The register A 46 stores information transferred from the synchronization controller in the wireless communication active RAT. More specifically, the register A 46 receives via the selector C 43 the information transferred from the synchronization controller in the wireless communication active RAT, and then stores the received information. When the RATα 20 performs wireless communications, the register A 46 stores via the selector C 43 the information of the wireless communication suspension time band, the RF setting information of the RATα 20, and the information indicating the measurement period use application transferred from the synchronization controller 23 in the RATα 20.

The register B 47 stores information transferred from the synchronization controller in the standby RAT. More specifically, the register B 47 receives via the selector C 43 the information transferred from the synchronization controller in the standby RAT and stores the received information. If the RATβ 30 is on standby, the register B 47 stores via the selector C 43 the measurement period information and the RF setting information transferred from the synchronization controller 33 in the RATβ 30. The register B 47 stores the measurement period information that is generated by the controller 48, based on the information stored on the register A 46. For example, the register B 47 stores the measurement period information that is generated from the information of the wireless communication suspension time band, the RF setting information of the RATα 20, and the information indicating the measurement period use application transferred from the RATα 20.

The RF switch 49 assigns the RF unit 50 to the RAT selected by the controller 48. More specifically, the RF switch 49 is notified of the wireless communication active RAT by the controller 48. The RF switch 49 transfers to the RF unit 50 a signal transferred from the RAT of which the controller 48 has notified the RF switch 49, and transfers a signal transferred from the RF unit 50 to the RAT of which the controller 48 has notified the RF switch 49.

If the RATα 20 is selected by the controller 48, the RF switch 49 receives from the controller 48 a notification indicating the RATα 20. Upon receiving the notification indicating the RATα 20, the RF switch 49 transfers a signal from the RATα 20 to the RF unit 50, and a signal from the RF unit 50 to the RATα 20.

The controller 48 controls elements 41-47 and 49 in the scheduler 40. More specifically, the controller 48 selects a wireless communication active RAT and notifies the selector A 41 of the selected RAT. The controller 48 also selects a standby RAT, and notifies the selector B 42 of the selected RAT. The controller 48 notifies the selector C 43 of the wireless communication active RAT and the standby RAT. The controller 48 also selects a standby RAT and notifies the RF switch 49 of the selected RAT.

If the information of the wireless communication suspension time band is stored on the register A 46, the controller 48 determines that the wireless communication active RAT is to suspend temporarily wireless communications. The controller 48 retrieves the information stored on the register A 46. If the information indicating the measurement target and the RF setting information transferred from the standby RAT is stored on the register B 47, the controller 48 determines that the standby RAT has requested the RF unit 50 to be assigned thereto.

In response to the information of the wireless communication suspension time band retrieved from the register A 46, the controller 48 sets to the counter 44 timer time to the start of the wireless communication suspension time band of the wireless communication active RAT. If the counter 44 notifies the controller 48 of timer out of the time to the wireless communication suspension time band, the controller 48 timer-sets time to the resumption of wireless communications of the RAT having suspended wireless communications, based on the information of the wireless communication suspension time band.

In response to a timer out notification of the time until the wireless communication suspension from the counter 44, the controller 48 selects a RAT that is to measure the reception level, and then notifies the RF switch 49 of the selected RAT. In response to the timer out notification of the time until the wireless communication suspension from the counter 44, the controller 48 sets the RF unit 50 based on the RF setting information stored on the register B 47.

In response to the timer out notification of the time until the wireless communication suspension from the counter 44, the controller 48 generates the measurement period information and stores the generated measurement period information on the register B 47. In response to the timer out notification of the time until the wireless communication suspension from the counter 44, the controller 48 instructs the pulse generator 45 to generate the interruption signal.

In response to a timer out notification from the counter 44 of the time until the resumption of wireless communications of the RAT having suspended wireless communications, the controller 48 instructs the pulse generator 45 to generates the interruption signal. In response to the timer out notification from the counter 44 of the time until the resumption of wireless communications of the RAT having suspended wireless communications, the controller 48 sets the RF unit 50 using the RF setting information stored on the register A 46. In response to the timer out notification from the counter 44 of the time until the resumption of wireless communications of the RAT having suspended wireless communications, the controller 48 selects a RAT that is to resume wireless communications, and notifies the RF unit 50 of the selected RAT.

A process of the controller 48 controlling elements 41-47 and 49 is specifically described. In the discussion that follows, the RATα 20 is a wireless communication active RAT having the RF unit 50 assigned thereto, and the RATβ 30 is a wireless communication standby RAT having no RF unit 50 assigned thereto. The following discussion is also based on the premise that the RATα 20 starts suspending temporarily wireless communications 5 seconds after the transmission of the information of the wireless communication suspension time band, and that the RATα 20 resumes wireless communications 15 seconds after the transmission of the information of the wireless communication suspension time band.

The controller 48 selects a wireless communication active RAT, and notifies the selector A 41 of the selected RAT. For example, the controller 48 selects a wireless communication active RATα 20 and notifies the selector A 41 that the RATα 20 has been selected.

The controller 48 selects a wireless communication standby RAT and notifies the selector B 42 of the selected RAT. For example, the controller 48 selects a standby RATβ 30 and notifies the selector B 42 that the RATβ 30 has been selected.

The controller 48 also notifies the selector C 43 of the wireless communication active RAT and the wireless communication standby RAT. For example, the controller 48 notifies the selector C 43 that the RATα 20 has been selected as a wireless communication active RAT and that the RATβ 30 has been selected as a standby RAT.

The controller 48 selects the wireless communication active RAT and notifies the RF switch 49 of the selected RAT. For example, the controller 48 notifies the RF switch 49 that the RATα 20 has been selected as the wireless communication active RAT.

If the information of the wireless communication suspension time band is stored on the register A 46, the controller 48 determines that the wireless communication active RAT is to suspend temporarily wireless communications and acquires the information from the register A 46. For example, if the information of the wireless communication suspension time band is transferred from the synchronization controller 23 in the RATα 20 and stored on the register A 46, the controller 48 determines that the RATα 20 is to suspend temporarily wireless communications. The controller 48 then retrieves the information of the wireless communication suspension time band, the RF setting information of the RATα 20, and the information indicating the measurement period use application, stored on the register A 46.

If the information indicating the measurement target and the RF setting information transferred from the standby RAT is stored on the register B 47, the controller 48 determines that the standby RAT has requested the RF unit 50 to be assigned thereto. For example, if the information indicating the measurement target and the RF setting information transferred from the synchronization controller 33 in the RATβ 30 is stored on the register B 47, the controller 48 determines that the RATβ 30 has requested the RF unit 50 to be assigned thereto. If the information indicating the measurement target transferred from the synchronization controller 33 in the RATβ 30 indicates the measurement of the reception level, the controller 48 determines that the RATβ 30 has requested the reception level to be measured.

Using the information of the wireless communication suspension time band retrieved from the register A 46, the controller 48 timer-sets on the counter 44 time lasting until the start of the temporary suspension of wireless communications of the wireless communication active RAT. For example, the controller 48 identifies 5 seconds as the time lasting until the start of the temporary suspension of wireless communications of the RATα 20, from the information of the wireless communication suspension time band retrieved from the register A 46. The controller 48 then timer-sets 5 seconds on the counter 44. Upon being timer set, the counter 44 immediately starts subtracting on the set time.

In response to the timer out notification of the time lasting until the wireless communication suspension from the counter 44, the controller 48 timer-sets the time to the resumption of wireless communications of the RAT having suspended wireless communications, in response to the information of the wireless communication suspension time band. For example, upon receiving the timer out notification from the counter 44 of the time lasting until the start of the wireless communication suspension of the RATα 20, the controller 48 timer-sets on the counter 44 10 seconds as the time lasting until the resumption of wireless communications of the RATα 20.

In response to the timer out notification from the counter 44 of the time lasting until the wireless communication suspension, the controller 48 selects a RAT that is to measure the reception level, and notifies the RF switch 49 of the selected RAT. For example, in response to the timer out notification from the counter 44 of the time lasting until the start of the wireless communication suspension of the RATα 20, the controller 48 selects the RATβ 30 that is to measure the reception level, and notifies the RF switch 49 that the RATβ 30 has been selected.

Upon receiving the timer out notification of the time lasting until the wireless communication suspension from the counter 44, the controller 48 sets the RF unit 50 using the RF setting information stored on the register B 47. For example, upon receiving the timer output notification from the counter 44 of the time lasting until the start of the wireless communication suspension of the RATα 20, the controller 48 retrieves the RF setting information of the RATβ 30 stored on the register B 47. The controller 48 sets the RF unit 50 based on the retrieved RF setting information of the RATβ 30.

Also in response to the timer out notification of the time lasting until the wireless communication suspension from the counter 44, the controller 48 generates the measurement period information and stores the generated measurement period information on the register B 47. For example, in response to the timer out notification from the counter 44 of the time lasting until the start of the wireless communication suspension of the RATα 20, the controller 48 generates the measurement period information from a variety of information of the RATα 20 stored on the register A 46. The controller 48 stores the generated measurement period information on the register B 47.

Also upon receiving the timer out notification of the time lasting until the wireless communication suspension from the counter 44, the controller 48 instructs the pulse generator 45 to generate the interruption signal. For example, the controller 48 instructs the pulse generator 45 to generates the interruption signal in response to the timer out notification from the counter 44 of the time lasting until the start of the wireless communication suspension of the RATα 20.

Upon receiving the timer out notification of the time lasting until the resumption of wireless communications from the counter 44, the controller 48 instructs the pulse generator 45 to generate the interruption signal. For example, the controller 48 instructs the pulse generator 45 to generate the interruption signal in response to the timer out notification from the counter 44 of the time lasting until the resumption of wireless communications of the RATα 20. The interruption signal is thus transferred to the interruption processor 35 in the RATβ 30. The interruption processor 35 in the RATβ 30 starts measuring the reception level.

Upon receiving the timer out notification of the time lasting until the resumption of wireless communications from the counter 44, the controller 48 sets the RF unit 50 using the RF setting information stored on the register A 46. For example, the controller 48 sets the RF unit 50 using the RF setting information of the RATα 20 stored on the register A 46, in response to the timer out notification from the counter 44 of the time lasting until the resumption of wireless communications of the RATα 20.

The controller 48 also selects the RAT that is to resume wireless communications and notifies the RF unit 50 of the selected RAT in response to the timer out notification of the time lasting until the resumption of wireless communications from the counter 44. For example, the controller 48 selects the RATα 20 and notifies the RF switch 49 that the RATα 20 has been selected, in response to the timer out notification from the counter 44 of the time lasting until the resumption of wireless communications of the RATα 20. In response, the RATα 20 can resume wireless communications.

Electrical circuits may be employed for the RF unit 50, the modem unit 21, the modem unit 31, the codec unit 22, the codec unit 32, the synchronization controller 23, the synchronization controller 33, the counter 24, the counter 34, the interruption processor 25, and the interruption processor 35. The counter 44, the pulse generator 45, and the RF switch 49 are also electronic circuits. The electronic circuits may be an integrated circuit such as an application specific integrated circuit (ASIC), a field programmable gate array (FPGA), a central processing unit (CPU) or a micro processing unit (MPU).

The selector A 41, the selector B 42, and the selector C 43, as electronic circuits, employ, for example, a pass transistor having an on-off switching function to select a destination of a signal.

Figure 4:
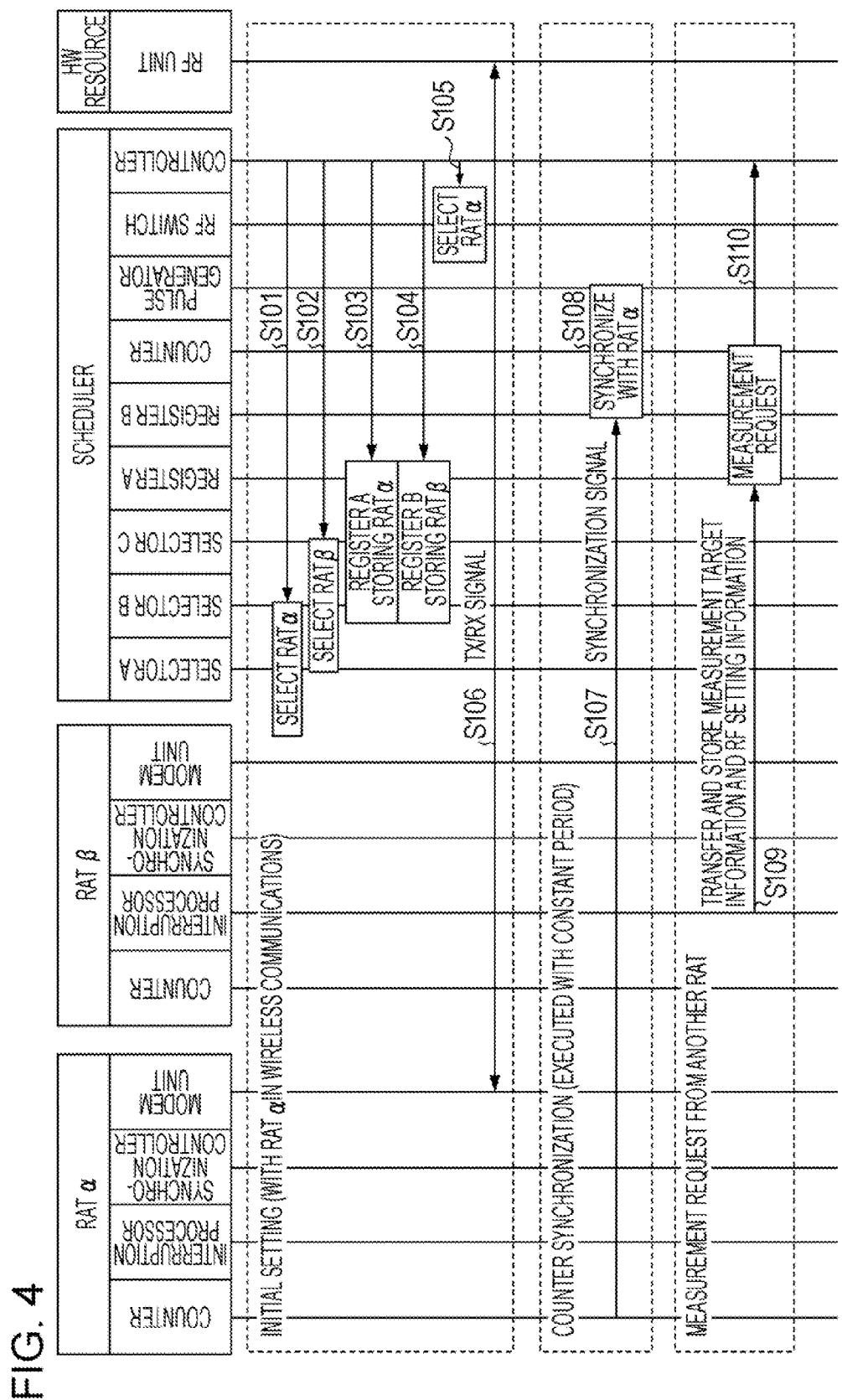
FIG. 4 is a sequence chart (1) illustrating a process flow of the mobile terminal of the second embodiment.
Figure 5:
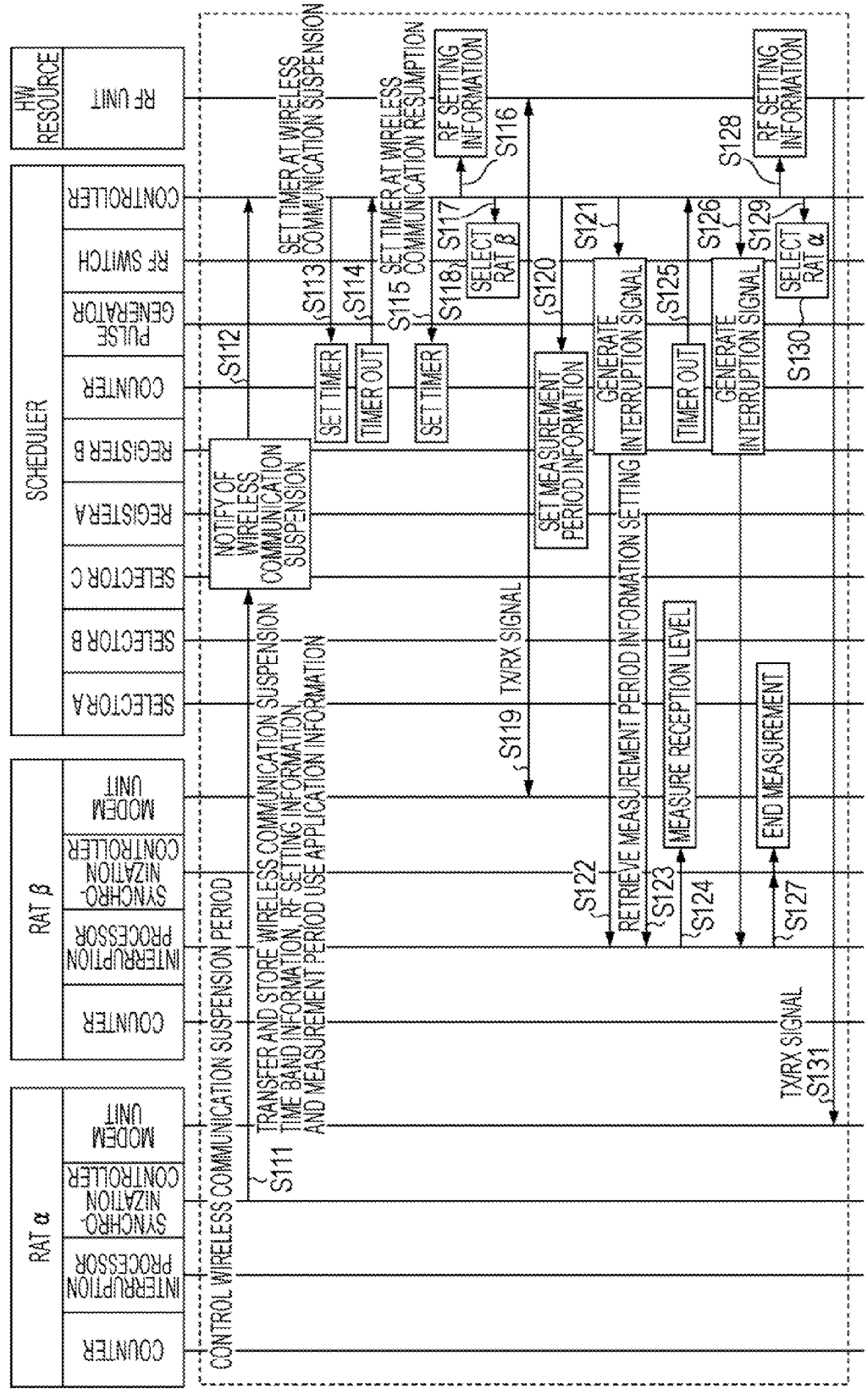
FIG. 5 is a sequence chart (2) illustrating a process flow of the mobile terminal of the second embodiment.

Process of the Mobile Terminal:

The process flow of the mobile terminal 10 is described below with reference to FIGS. 4 and 5. Described below with reference to FIGS. 4 and 5 are an initial setting process, a counter synchronization process, and a process of receiving a measurement request from a standby RAT performed by the mobile terminal 10. FIG. 4 is a sequence chart (1) illustrating the process flow of the mobile terminal 10 of the second embodiment.

Referring to FIG. 4, the RATα 20 is a wireless communication active RAT having the RF unit 50 assigned thereto and the RATβ 30 is a standby RAT having no RF unit 50 assigned thereto. The hardware (HW) resource illustrated on the top right corner of each of FIGS. 4 and 5 refers to the RF unit 50 and the antenna 13.

The process flow of the initial setting process for the RATα 20 to perform wireless communications is described below. The controller 48 in the scheduler 40 selects the wireless communication active RATα 20 and notifies the selector A 41 that the RATα 20 has been selected (step S101). The controller 48 in the scheduler 40 selects the standby RATβ 30 and notifies the selector B 42 that the RATβ 30 has been selected (step S102).

The controller 48 in the scheduler 40 notifies the selector C 43 that the RATα 20 has been selected as a wireless communication active RAT (step S103). The controller 48 in the scheduler 40 notifies the selector C 43 that the RATβ 30 has been selected as a standby RAT (step S104).

The controller 48 in the scheduler 40 notifies the RF switch 49 that the RATα 20 has been selected as the standby RAT (step S105). The modem unit 21 in the RATα 20 exchanges TX/RX signals with the RF unit 50, thereby performs wireless communications (step S106).

The counter synchronization process for synchronizing the counter 24 in the RATα 20 with the counter 44 in the scheduler 40 is described below. Since the controller 48 selects the RATα 20 in the process step in step S101, the selector A 41 in the scheduler 40 transfers to the counter 44 in the scheduler 40 the synchronization signal transferred from the counter 24 in the RATα 20 (step S107).

The counter 44 in the scheduler 40 establishes synchronization with the counter 24 in the RATα 20 (step S108) using the synchronization signal. The counter 44 establishes synchronization with the RATα 20 every constant period.

The process of the RATβ 30 requesting the RF unit 50 to be assigned thereto to measure the reception level is described below. The synchronization controller 33 in the RATβ 30 transfers the information indicating the measurement of the reception level as the measurement target and the RF setting information of the RATβ 30 to the register B 47 via the selector C 43 in the scheduler 40 to store these pieces of information on the register B 47 (step S109). In response to the variety of information stored on the register B 47, the controller 48 in the scheduler 40 determines that the RATβ 30 has requested the reception level to be measured (step S110).

A control process performed during a TX/RX suspension period is discussed with reference to FIG. 5. The control process includes assigning the RF unit 50 to the standby RAT and causing the standby RAT to measure the reception level during the wireless communication suspension time band of the wireless communication active RAT. FIG. 5 illustrates a sequence chart (2) explaining the process flow of the mobile terminal 10 of the second embodiment. As illustrated in FIG. 5, the RF unit 50 is assigned to the RATβ 30 during the wireless communication suspension time band of the wireless communication active RATα 20.

The synchronization controller 23 in the RATα 20 transfers to the register A 46 in the scheduler 40 the information of the wireless communication suspension time band, the RF setting information, and the information indicating the measurement period use application to store these pieces of information on the register A 46 (step S111). The controller 48 determines from the variety of information stored on the register A 46 that the RATα 20 is to suspend temporarily wireless communications, and retrieves the variety of information from the register A 46 (step S112).

Using the information of the wireless communication suspension time band stored on the register A 46, the controller 48 in the scheduler 40 timer-sets on the counter 44 the time lasting until the start of the wireless communication suspension time band of the RATα 20 (step S113). If the timer set time is reached, the counter 44 in the scheduler 40 notifies the controller 48 of the timer out (step S114).

In response to the timer out notification from the counter 44, the controller 48 in the scheduler 40 timer-sets the time lasting until the resumption of wireless communications by the RATα 20 having suspended wireless communications (step S115). Also in response to the timer out notification from the counter 44, the controller 48 in the scheduler 40 sets the RF unit 50 using the RF setting information of the RATβ 30 stored on the register B 47 (step S116).

The controller 48 in the scheduler 40 notifies the RF switch 49 that the RATβ 30 has been selected (step S117). The RF switch 49 in the scheduler 40 assigns the RF unit 50 to the RATβ 30 (step S118). The modem unit 31 in the RATβ 30 acquires the TX/RX signals via the RF unit 50 (step S119).

The controller 48 in the scheduler 40 generates the measurement period information and stores the generated measurement period information on the register B 47 (step S120). The controller 48 in the scheduler 40 causes the pulse generator 45 to generate the interruption signal (step S121). The interruption processor 35 in the RATβ 30 receives the interruption signal via the selector B 42 in the scheduler 40 (step S122).

In response to the received interruption signal, the interruption processor 35 in the RATβ 30 retrieves the measurement period information stored on the register B 47 in the scheduler 40 via the synchronization controller 33 (step S123). The interruption processor 35 in the RATβ 30 measures the reception level using the retrieved measurement period information and the TX/RX signals acquired in step S119 (step S124).

When the timer time set in S112 is out, the counter 44 in the scheduler 40 notifies the controller 48 of the timer out (step S125). If the time for the RATα 20 to resume wireless communications is reached, the counter 44 in the scheduler 40 notifies the controller 48 of the timer out.

In response to the timer out notification, the controller 48 in the scheduler 40 causes the pulse generator 45 to generate the interruption signal (step S126). Upon receiving the interruption signal again, the interruption processor 35 in the RATβ 30 ends the measurement of the reception level (step S127).

In response to the received timer out notification, the controller 48 in the scheduler 40 sets the RF unit 50 in accordance with the RF setting information of the RATα 20 retrieved in step S112 (step S128). The controller 48 in the scheduler 40 notifies the RF switch 49 that the RATα 20 has been selected (step S129). In response to the received notification that the RATα 20 has been selected, the RF switch 49 assigns the RF unit 50 to the RATα 20 (step S130). The RATα 20 resumes wireless communications using the modem unit 21 (step S131).

Advantages of the Second Embodiment

The mobile terminal 10 of the second embodiment includes the scheduler 40. The scheduler 40 assigns the RF unit 50 to the standby RAT during the wireless communication suspension time band of the wireless communication active RAT, and causes the standby RAT to measure the reception level. Without the need for the wireless communication active RAT to notify the standby RAT of the wireless communication suspension time band, the mobile terminal 10 can cause the standby RAT to acquire the reception level during the wireless communication suspension time band of the wireless communication active RAT.

Without the need for the interface between the RATs 20 and 30 and the algorithm calculating the wireless communication suspension time band, the mobile terminal 10 causes the other RAT to acquire the reception level during the wireless communication suspension time band of the wireless communication active RAT. As a result, the mobile terminal 10 has an improved expandability. For example, the mobile terminal 10 includes the RATs 20 and 30 having mutually independent to each other, and independent design and development of each of the RATs 20 and 30 are possible. With expandability assured, a new RAT can be easily added.

The mobile terminal 10 transfers the interruption signal to the standby RAT at the start of the wireless communication suspension time band of the wireless communication active RAT, and causes the standby RAT to measure the reception level. Without the need for the algorithm for one of the RATs 20 and 30 to calculate the wireless communication suspension time band of the other of the RATs 20 and 30, the mobile terminal 10 measures the reception level during the wireless communication suspension time band. As a result, the mobile terminal 10 needs no algorithm to calculate the wireless communication suspension time band at each of the RATs 20 and 30, and expandability of the mobile terminal 10 is increased.

The mobile terminal 10 causes the counter in the wireless communication active RAT to synchronize with the counter 44 in the scheduler 40, and causes the standby RAT at the timing indicated by the counter 44. The mobile terminal 10 is thus free from a mechanism for establishing synchronization between the counters in the RATs. This feature allows each RAT to be easily expanded, and expandability of the RAT is thus increased.

Third Embodiment

Figure 6:
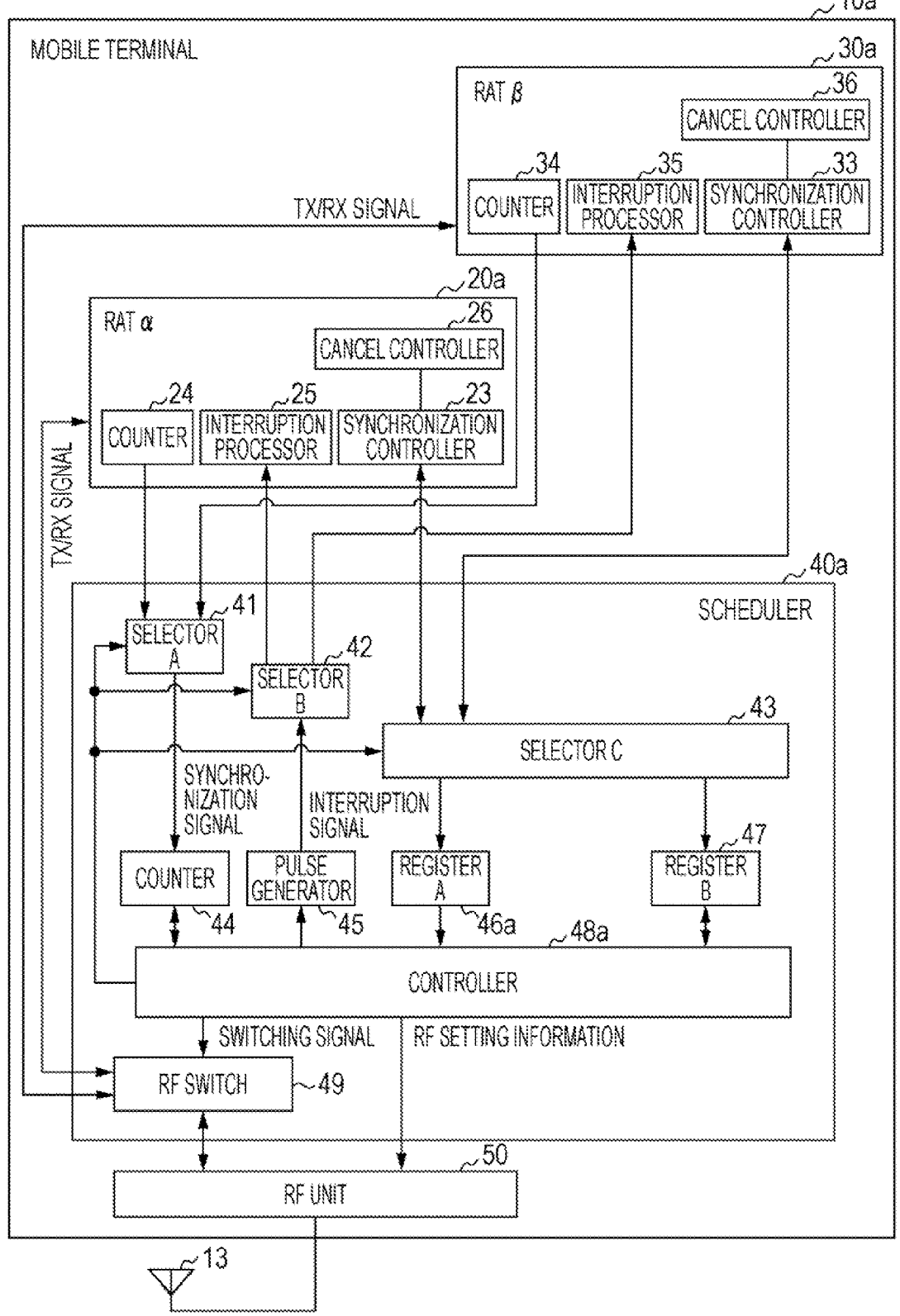
FIG. 6 illustrates a structure of each RAT and a scheduler according to a third embodiment.

A mobile terminal 10a of a third embodiment performing a cancel process is described below. Referring to FIG. 6, the structure of the mobile terminal 10a performing the cancel process is discussed below. FIG. 6 illustrates radio access technology (RAT) modules and a scheduler of the third embodiment. The mobile terminal 10a of the third embodiment is similar to the mobile terminal 10. The discussion of the same process step as that of the second embodiment is omitted here.

Mobile Terminal:

As illustrated in FIG. 6, the mobile terminal 10a of the third embodiment includes RATα 20a and RATβ 30a, scheduler 40a, radio frequency (RF) unit 50, and antenna 13. The elements 20a-50 illustrated in FIG. 6 have the same functions as those of the elements 20-50 of the second embodiment, respectively. The RATα 20a of the third embodiment further includes a cancel controller 26. The RATβ 30a further includes a cancel controller 36.

If a TX/RX process, which is to be performed with priority over performing the wireless communication suspension, during the wireless communication suspension time band, the RATα 20a of the third embodiment cancels the wireless communication suspension. More specifically, if a TX/RX process takes place, which is to be performed with priority over performing the wireless communication suspension, during the wireless communication suspension time band, the RATα 20a notifies the scheduler 40a information indicative of cancelling of the wireless communication suspension.

The scheduler 40a may assign the RF unit 50 to the RATα 20a after the RATα 20a has notified the scheduler 40a of the cancelling of the wireless communication suspension. The RATα 20a then resumes wireless communications. More specifically, the RATα 20a resumes wireless communications via the RF unit 50 reassigned thereto after notifying the scheduler 40a of the cancelling of the wireless communication suspension.

If the use permission of the antenna 13 provided by the scheduler 40a is canceled during the measurement of the reception level, the RATα 20a stops measuring the reception level. More specifically, upon receiving the interruption signal from the scheduler 40a during the measurement of the reception level, the RATα 20a stops measuring the reception level.

For example, if the RATβ 30a cancels the wireless communication suspension thereof, the RATα 20a in the middle of measuring the reception level receives the interruption signal from the scheduler 40a. Upon receiving the interruption signal from the scheduler 40a, the RATα 20a in the middle of measuring the reception level stops measuring the reception level.

When the RATα 20a stops measuring the reception level, the RATα 20a requests the scheduler 40a again to measure the reception level. More specifically, in response to the stopping of the measurement of the reception level, the RATα 20a transfers to the scheduler 40a the RF setting information and the information indicating the measurement target to request the scheduler 40a to measure the reception level.

If a TX/RX process, which is to be performed with priority over performing the wireless communication suspension, during the wireless communication suspension time band, the RATβ 30a of the third embodiment cancels the wireless communication suspension. More specifically, if a TX/RX process takes place, which is to be performed with priority over performing the wireless communication suspension, during the wireless communication suspension time band, the RATβ 30a notifies the scheduler 40a of information indicative of cancelling of the wireless communication suspension.

The scheduler 40a may re-assign the RF unit 50 to the RATβ 30a after the RATβ 30a has notified the scheduler 40a of the cancelling of the wireless communication suspension. The RATβ 30a then resumes wireless communications. More specifically, the RATβ 30a resumes wireless communications via the RF unit 50 reassigned thereto after notifying the scheduler 40a of the cancelling of the wireless communication suspension.

If the use permission of the antenna 13 provided by the scheduler 40a is canceled during the measurement of the reception level, the RATβ 30a stops measuring the reception level. More specifically, upon receiving the interruption signal from the scheduler 40a during the measurement of the reception level, the RATβ 30a stops measuring the reception level.

For example, if the RATα 20a cancels the wireless communication suspension thereof, the RATβ 30a in the middle of measuring the reception level receives the interruption signal from the scheduler 40a. Upon receiving the interruption signal from the scheduler 40a, the RATβ 30a in the middle of measuring the reception level stops measuring the reception level.

When the RATβ 30a stops measuring the reception level, the RATβ 30a requests the scheduler 40a again to measure the reception level. More specifically, in response to the stopping of the measurement of the reception level, the RATβ 30a transfers to the scheduler 40a the RF setting information and the information indicating the measurement target to request the scheduler 40a to measure the reception level.

To cause the RAT in a wireless communication suspended state to use the antenna during the measurement of the reception level, the scheduler 40a cancels the use permission of the antenna. More specifically, if the scheduler 40a acquires information indicating the cancelling of the wireless communication suspension from the RAT in a wireless communication suspended state, the scheduler 40a causes the RAT in the middle measuring the reception level to suspend the measurement of the reception level. The scheduler 40a re-assigns the RF unit 50, assigned to the RAT having stopped measuring the reception level, to the RAT having canceled the wireless communication suspension.

The process of the scheduler 40a is specifically described below. In the discussion that follows, the RATα 20a cancels the wireless communication suspension subsequent to the start of the wireless communication suspension, and the RATβ 30a is in the middle of measuring the reception level.

When the RATα 20a temporarily suspends wireless communications, the scheduler 40a assigns the antenna 13 to the RATβ 30a and causes the RATβ 30a to measure the reception level. Upon receiving a notification of the wireless communication suspension from the RATα 20a, the scheduler 40a transfers to the RATβ 30a the synchronization signal to cause the RATβ 30a to suspend the acquisition of the reception level. The scheduler 40a re-assigns the RF unit 50, assigned to the RATβ 30a, to the RATα 20a.

The elements 21-25 in the RATα 20a and the elements 41-49 in the scheduler 40a of the third embodiment are described below. The elements 21-25 in the RATα 20a and the elements 31-35 in the RATβ 30a of the third embodiment perform the same processes as those of the elements 21-35 of the second embodiment, and the detailed discussion thereof is omitted here.

If a TX/RX process having priority over the wireless communication suspension occurs, the cancel controller 26 in the RATα 20a of the third embodiment notifies the scheduler 40a of information of the cancelling the wireless communication temporary suspension. More specifically, the cancel controller 26 transfers to the register A 46a the information indicating the canceling of the wireless communication temporary suspension via the synchronization controller 23 and the selector C 43 in the scheduler 40a to store the information on the register A 46a.

If a TX/RX process having priority over the wireless communication suspension occurs, the cancel controller 36 in the RATβ 30a of the third embodiment notifies the scheduler 40a of information of the cancelling the wireless communication temporary suspension. More specifically, the cancel controller 36 transfers to the register A 46a the information indicating the canceling of the wireless communication temporary suspension via the synchronization controller 33 and the selector C 43 in the scheduler 40a to store the information on the register A 46a.

Upon receiving the information indicating the canceling of the wireless communication temporary suspension from the synchronization controller of the RAT having temporary suspended wireless communications, the register A 46a of the third embodiment stores the received information. For example, if the register A 46a has received the information indicating the canceling of the wireless communication temporary suspension from the cancel controller 26 in the RATα 20a, the register A 46a stores the received information.

If the information indicating the canceling the wireless communication temporary suspension is stored on the register A 46a, the controller 48a in the scheduler 40a determines that the RAT has canceled the wireless communication temporary suspension. Upon determining that the RAT has canceled the wireless communication temporary suspension, the controller 48a stops timer counting set on the counter 44.

Upon determining that the RAT has canceled the wireless communication temporary suspension, the controller 48a causes the pulse generator 45 to generate the interruption signal. The controller 48a notifies the RF switch 49 of the RAT having canceled the wireless communication temporary suspension.

The process of the controller 48a is specifically discussed. After temporarily suspending wireless communications, the RATα 20a cancels the wireless communication temporary suspension, and the RATβ 30a is in the middle of measuring the reception level.

If the information indicating the canceling of the wireless communication temporary suspension is stored on the register A 46a, the controller 48a determines the RAT has canceled the wireless communication temporary suspension. For example, if the information indicating the canceling of the wireless communication temporary suspension is stored on the register A 46a, the controller 48a determines the RATα 20a has canceled the wireless communication temporary suspension.

Upon determining that the RAT has canceled the wireless communication temporary suspension, the controller 48a stops the timer set on the counter 44. For example, upon determining that the RATα 20a has canceled the wireless communication temporary suspension, the controller 48 stops the timer on the counter 44.

Upon determining that the RAT has canceled the wireless communication temporary suspension, the controller 48a causes the pulse generator 45 to generate the interruption signal. For example, upon determining that the RATα 20a has canceled the wireless communication temporary suspension, the controller 48a causes the pulse generator 45 to generate the interruption signal. The interruption signal is transferred to the synchronization controller 33 in the RATβ 30 via the register B 47. The controller 48a in the scheduler 40 in this way causes the RATβ 30a to suspend the measurement of the reception level.

The controller 48a notifies the RF switch 49 of the RAT having canceled the wireless communication temporary suspension. For example, the controller 48 notifies the RF switch 49 of the RATα 20a as the RAT having canceled the wireless communication temporary suspension.

The cancel controller 26 and the cancel controller 36 are electronic circuits. The electronic circuits include an integrated circuit such as ASIC or FPGA, or CPU or MPU.

Figure 7:
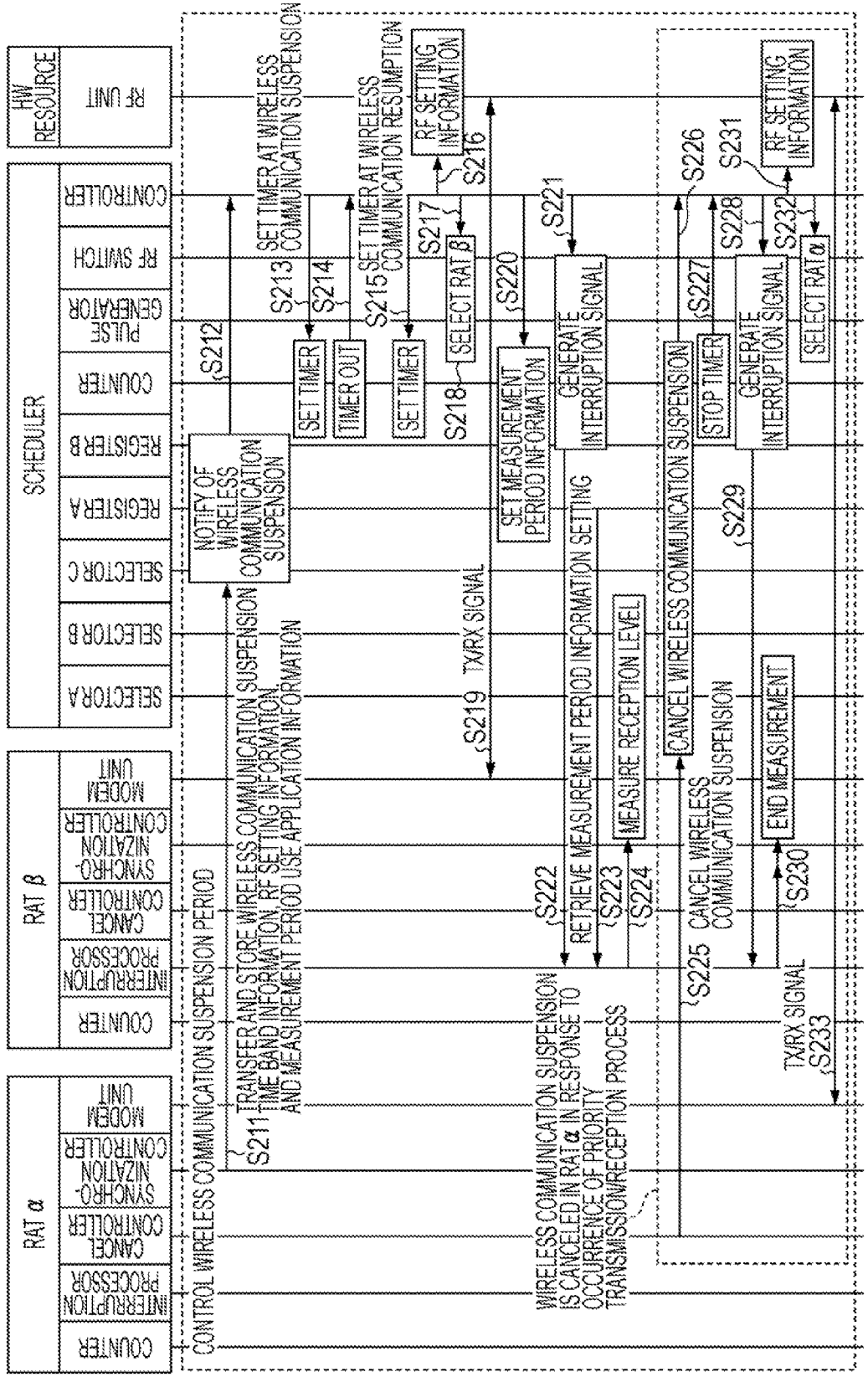
FIG. 7 is a sequence chart illustrating a process flow of the mobile terminal of the third embodiment.

Process of the Mobile Terminal:

Discussed with reference to FIG. 7 is the process flow of the process performed when the RATα 20a of the third embodiment cancels the wireless communication temporary suspension. FIG. 7 is a sequence chart illustrating the process flow of the mobile terminal 10a of the third embodiment. As illustrated in FIG. 7, the RATα 20a cancels the wireless communication temporary suspension after starting the wireless communication temporary suspension, and the RATβ 30a is in the middle of measuring the reception level.

The initial setting process for the RATα 20a to perform wireless communications and the process for causing the counter 24 in the RATα 20a to synchronize with the counter 44 in the scheduler 40a are identical to those illustrated in FIG. 4, and the discussion thereof is omitted here. The process for the RATβ 30a to request the RF unit 50 be assigned thereto to measure the reception level is identical to the process illustrated in FIG. 4, and the discussion thereof is omitted here. Steps S211-S224 in FIG. 7 are respectively identical to steps S111-S124 in FIG. 5, and the discussion thereof is omitted here.

The RATα 20a temporarily suspends wireless communications, and the scheduler 40a assigns the RF unit 50 to the standby the RATβ 30 in response to information transferred from the RATα 20, and causes the RATβ 30 to measures the reception level (steps S211-224). When the RATα 20a cancels the wireless communication temporary suspension, the cancel controller 26 in the RATα 20a transfers to the register A 46 in the scheduler 40a the information indicating the canceling of the wireless communication temporary suspension (step S225). If the information indicating the canceling of the wireless communication temporary suspension is stored on the register A 46a, the controller 48a in the scheduler 40a determines that the RATα 20a is to cancel the wireless communication temporary suspension (step S226).

Upon determining that the RATα 20a is to cancel the wireless communication temporary suspension, the controller 48a in the scheduler 40 stops the timer set on the counter 44 in step S215 (step S227). The controller 48a in the scheduler 40 causes the pulse generator 45 to generate the interruption signal (step S228). In response to the received interruption signal (step S229), the interruption processor 35 in the RATβ 30 ends the measurement of the reception level (step S230).

Using the RF setting information of the RATα 20a, the controller 48a in the scheduler 40 sets the RF unit 50 (step S231). The controller 48a in the scheduler 40 notifies the RF switch 49 that the RATα 20a has been selected (step S232). The modem unit 21 in the RATα 20a resumes wireless communications via the RF unit 50 (step S233).

Advantages of the Third Embodiment

As described above, the mobile terminal 10a of the third embodiment suspends the measurement of the reception level by one RAT in the middle of the measurement of the reception level if another RAT cancels the wireless communication temporary suspension. The mobile terminal 10a then re-assigns the RF unit 50 to the RAT having canceled the wireless communication temporary suspension and causes the RAT to resume wireless communications. The mobile terminal 10a thus performs priority communication occurring in each of the RATs. As a result, the mobile terminal 10a not only increases expandability thereof but also assigns the RF unit 50 efficiently.

Fourth Embodiment

Figure 8:
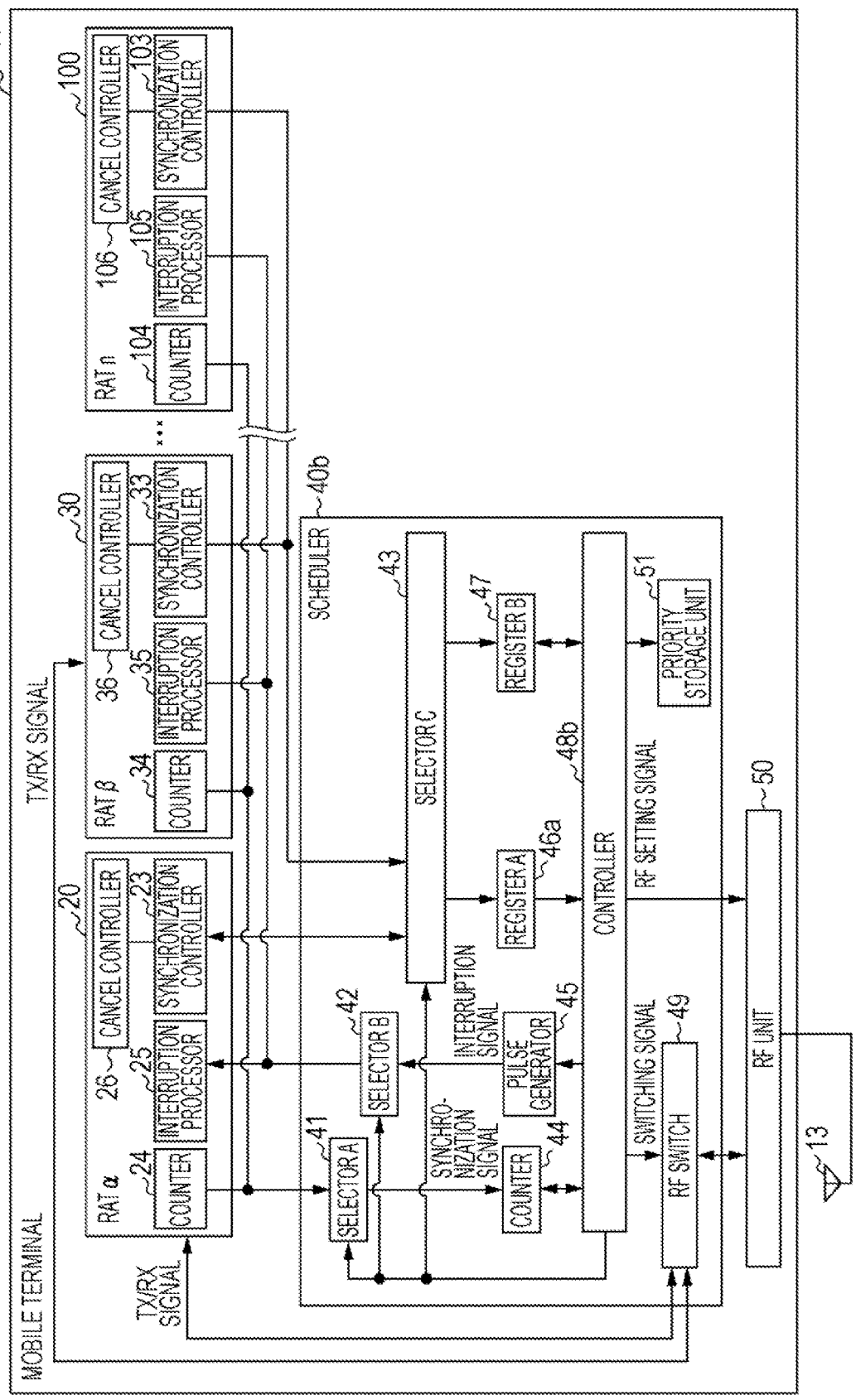
FIG. 8 illustrates a structure of each RAT and a scheduler according to a fourth embodiment.

A fourth embodiment relates to a mobile terminal 10b that attaches to each RAT a priority to measure the reception level and causes the RAT to measure the reception level in accordance with the priority attached thereto. Discussed with reference to FIG. 8 is a structure of the mobile terminal 10b that attaches to each RAT a priority to measure the reception level and causes the RAT to measure the reception level in accordance with the priority attached thereto. FIG. 8 illustrates the structure of each RAT and a scheduler in accordance with the fourth embodiment. The discussion of elements in the mobile terminal 10b of the fourth embodiment, which are identical to those of the mobile terminal of the second and third embodiments, is omitted here.

The mobile terminal 10b includes a plurality of RATs 20-100, one RF unit 50, one scheduler 40, and one antenna 13. Each of the RATs 20-100 has the same function as that of the RATα 20 of the second embodiment or the RATα 20a of the third embodiment. Elements 103-106 in RATn 100 are identical in function to the elements 23-26, respectively.

As the scheduler of the second and third embodiments, the scheduler 40b of the fourth embodiment includes elements 41-49. The scheduler 40b includes a controller 48b, and a priority storage unit 51. The elements 41-49 in the scheduler 40b are identical in function to the elements 41-49 in the second and third embodiments, respectively.

If a wireless communication active RAT is to suspend temporarily wireless communications, the scheduler 40b permits each of the RATs 20-100 to use the RF unit 50 in response to the priority set for each of the RATs 20-100. More specifically, the scheduler 40b sets a priority to each of the RATs 20-100 and stores the priorities set on the RATs 20-100. The scheduler 40b also stores a cumulative value of a measurement count of the reception level of each of the RATs 20-100.

If the RF unit 50 is assigned to a standby RAT, the scheduler 40b compares a cumulative value of a measurement count, at which each RAT requesting the RF unit 50 to be assigned thereto has measured the reception level, with the priority set at each RAT. The scheduler 40b assigns the RF unit 50 such that the ratio of the cumulative values of the measurement counts, at which the RATs requesting the RF unit 50 to be assigned thereto have measured the reception level, equals the ratio of the priorities set at the RATs.

An example of the process of the scheduler 40b is described below. The following discussion is based on the premise that the RATα 20 is to suspend wireless communications temporarily, that the RATs 20-100 measure the reception level once for each RAT, and that the same priority "1" is attached to each of the RATs 20-100. If each of the RATs 30-100 requests the scheduler 40b to assign the RF unit 50 thereto, the scheduler 40b assigns the RF unit 50 to the RAT 100, and causes the RAT 100 to measure the reception level. If the RATs requesting the RF unit 50 to be assigned thereto are only the RAT 100, the scheduler 40b assigns the RF unit 50 to the RAT 100.

The priority storage unit 51 in the scheduler 40b of the fourth embodiment stores the cumulative values of measurement counts of the RATs 20-100. The priority storage unit 51 also stores the priorities set on the RATs 20-100.

The controller 48b in the scheduler 40b of the fourth embodiment retrieves from the priority storage unit 51 the cumulative values of the measurement counts of the RATs 20-100 and the priorities set on the RATs 20-100. The controller 48b compares the cumulative value of measurement count of each of the RATs 20-100 requesting the RF unit 50 to be assigned thereto with the priority of each of the RATs 20-100. The controller 48b selects an RAT to assign the RF unit 50 thereto such that the cumulative values of the measurement counts of the reception levels by the RATs 20-100 have the same ratio as the ratio of the priorities set to the RATs 20-100. The controller 48b updates the measurement count cumulative values of the reception level of the RATs 20-100 stored on the priority storage unit 51.

A series of process steps of the controller 48b is described in detail below. In the discussion that follows, the RATs 30-1000 request the controller 48b to assign the RF unit 50 thereto during the wireless communication suspension time band of the RATα 20, a priority "2" is set on the RATβ 30, a priority "1" is set on the other RATs, and the measurement counts of the reception level of the RATs 20-100 are the same.

If the RATα 20 having the RF unit 50 assigned thereto suspends temporarily wireless communications, the controller 48b retrieves from the priority storage unit 51 the measurement counts of the reception level of the RATs 20-100 and the priorities set on the RATs 20-100. The controller 48 compares the measurement counts of the reception level of the RATs 20-100 with the priorities set on the RATs 20-100. The priority set on the RATβ 30 is "2" and is larger than a priority "1" set on the other RATs. The reception level measurement counts of the RATs 20-100 are all the same.

During the wireless communication suspension time band of the RATα 20 having the RF unit 50 assigned thereto, the controller 48b selects the RATβ 30 as a RAT to which the RF unit 50 is to be assigned. The controller 48b notifies the RF switch 49 that the RATβ 30 has been selected, and assigns the RF unit 50 to the RATβ 30. The controller 48b then updates the reception level measurement count cumulative value of the RATβ 30 on the priority storage unit 51.

The priority storage unit 51 may be a semiconductor memory such as RAM, ROM, or a flash memory, or a storage device such as a hard disk or an optical disk.

Figure 9:
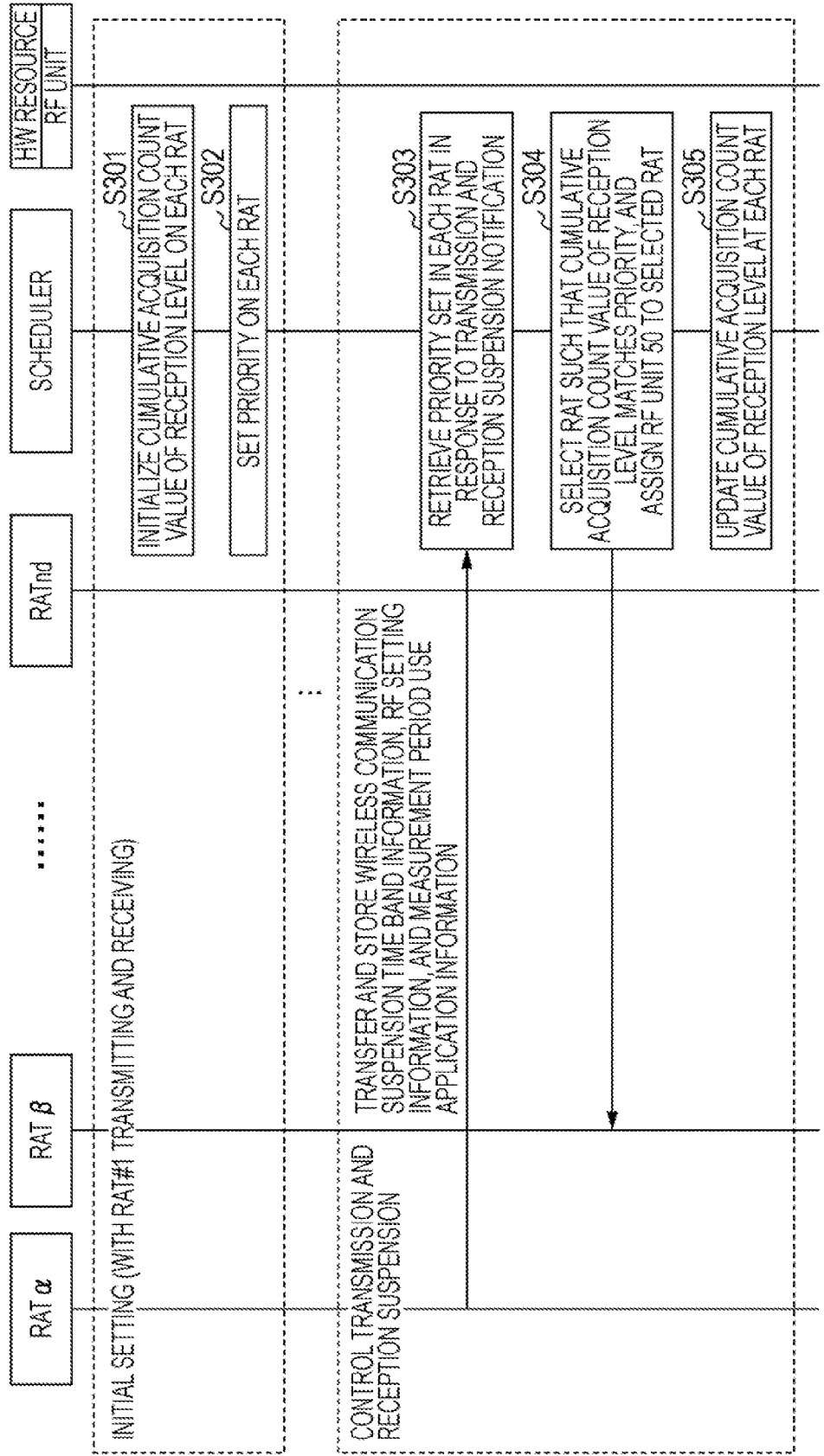
FIG. 9 is a sequence chart illustrating a process flow of the mobile terminal of the fourth embodiment.

Referring to FIG. 9, the process of the mobile terminal 10b of the fourth embodiment is described below. FIG. 9 is a sequence chart illustrating the process of the mobile terminal 10b of the fourth embodiment. Referring to FIG. 9, the RF unit 50 is assigned to a standby RAT 30 during the wireless communication suspension time band of the RATα 20.

The detailed description of the initial setting process of the RATα 20 for wireless communications, and the process of establishing synchronization between the counters of the RATs 20-100 and the counter 44 in the scheduler 40b is omitted here. The description of the process of the RATs 30-100 that request the RF unit 50 to be assigned thereto to measure the reception level is also omitted here.

The scheduler 40b initializes the reception level measurement count cumulative value of each RAT stored on the priority storage unit 51 (step S301). The scheduler 40b sets the priorities of the RATs 20-100 to be stored on the priority storage unit 51 (step S302).

The scheduler 40b assigns the RF unit 50 to the RATα 20 which is to perform wireless communications and causes the RATα 20 to performs wireless communications. In order to measure the reception level, the RATs 30-100 request the scheduler 40b to assign the RF unit 50 thereto. If the RATα 20 suspends temporarily wireless communications, the RATα 20 transfers to the scheduler 40b the information of the wireless communication suspension time band. In response to the received information of the wireless communication suspension time band, the scheduler 40b determines that the RATα 20 is to suspend temporarily wireless communications.

Advantages of the Fourth Embodiment

If the information of the wireless communication suspension time band is retrieved from the RATα 20, the scheduler 40b retrieves from the priority storage unit 51 the priority of the RAT having requested the RF unit 50 to be assigned thereto, and the cumulative value of the reception level measurement count of each RAT (step S303). The scheduler 40b selects a RAT that causes the reception level measurement counts to have the same ratio as the ratio of the priorities, notifies the RF switch 49 of information indicating the selected RAT, and assigns the RF unit 50 to the selected RAT (step S304). The scheduler 40b updates the cumulative value of the reception level measurement count of each of the RATs 20-100 (step S305).

The mobile terminal 10b of the fourth embodiment assigns the RF unit 50 to each of the RATs 20-100 depending on the reception level measurement count of each of the RATs 20-100 and the priorities set on the RATs 20-100, and causes the RAT having the RF unit 50 assigned thereto to measure the reception level. The mobile terminal 10b can effectively assign the RF unit 50 to the RATs 20-100. As a result, the mobile terminal 10b has increased expandability, and assigns the RF unit 50 to each of the RATs in an appropriate time division manner.

If a wireless communication method applied to the RATβ 30 needs more frequent reception level measurements than the other wireless communication methods, the mobile terminal 10b sets on the RATβ 30 a priority higher than the priorities of the other RATs. The mobile terminal 10b in this way causes the RATβ 30 to measure the reception level at a higher frequency of occurrences than the other RATs. As a result, the mobile terminal 10b has increased expandability, and assigns the RF unit 50 to each of the RATs in an appropriate time division manner.

For example, if the RAT suspends temporarily wireless communications, the mobile terminal 10b assigns the RF unit 50 with priority to only a RAT that has requested the RF unit 50 to be assigned thereto to measure the reception level. The mobile terminal 10b can thus assign the RF unit 50 more appropriately.

Fifth Embodiment

The embodiments described above may be modified in a variety of arrangements described below. Such modifications are described below.

Figure 10:
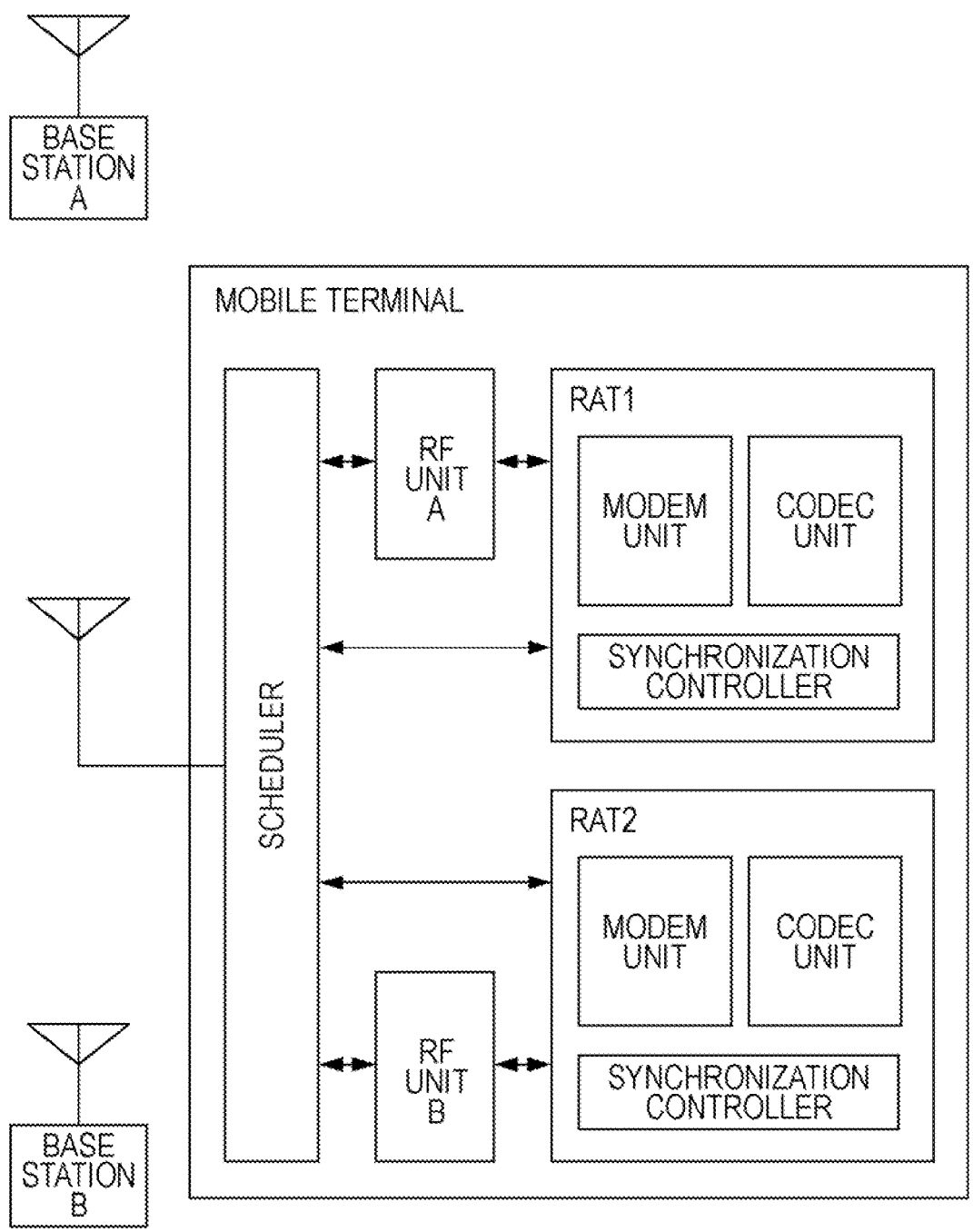
FIG. 10 is a diagram (1) illustrating an installation example of the scheduler.
Figure 11:
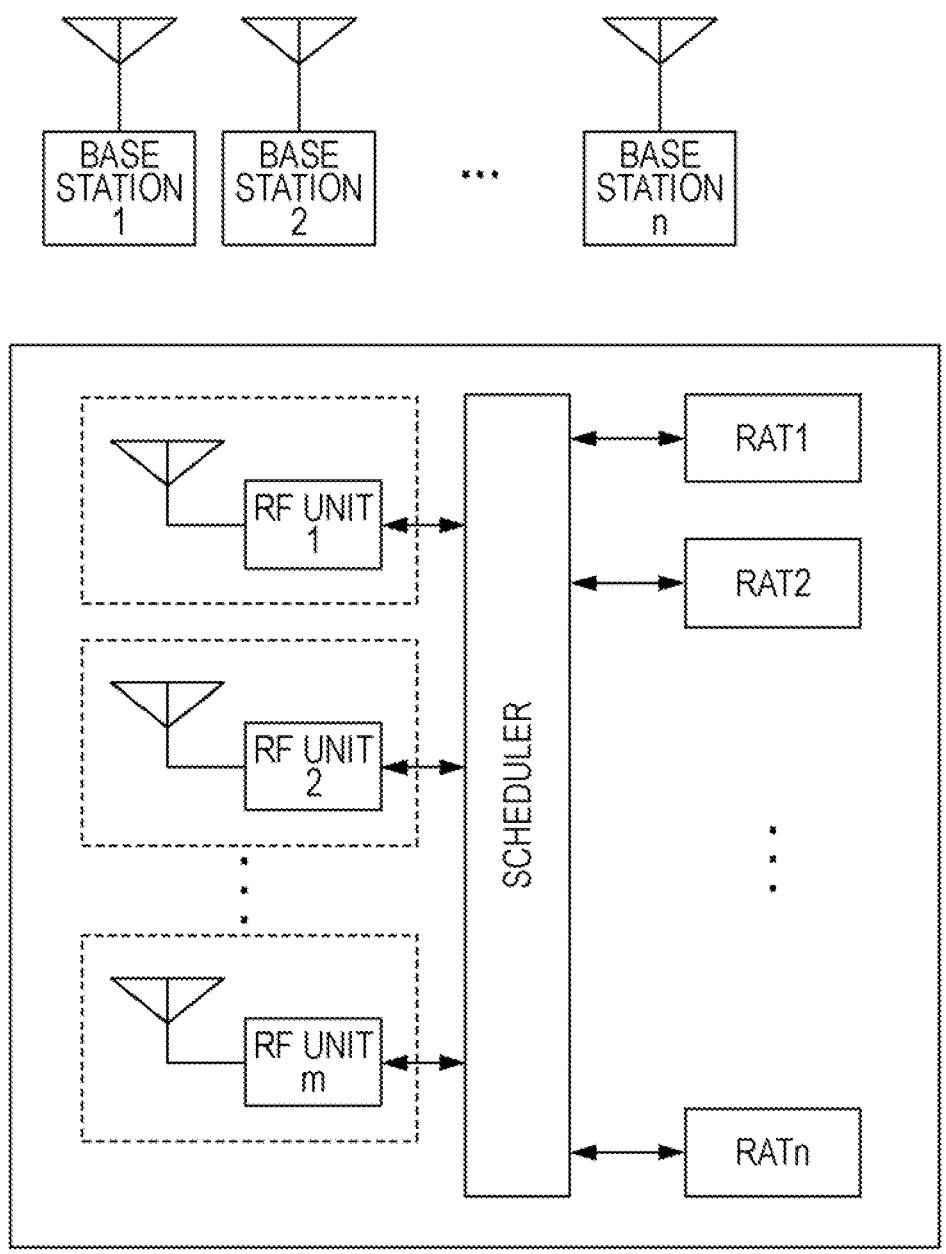
FIG. 11 is a diagram (2) illustrating the installation example of the scheduler.

(1) Mobile Terminal:

In accordance with the first through third embodiments, the mobile terminal includes one antenna and one RF unit. In accordance with the first through fourth embodiments, the mobile terminal includes, as wireless resources, one antenna and one RF unit. The mobile terminal is not limited to this arrangement. The mobile terminal may includes a plurality of antennas, and a plurality of RF units, a plurality of RATS, and a scheduler that assigns the plurality of antennas and the plurality of RF units to a RAT. With reference to FIGS. 10 and 11, an example of the mobile terminal is described below. FIG. 10 is a diagram (1) illustrating an installed example of the scheduler. FIG. 11 is a diagram (2) illustrating another installed example of the scheduler.

The mobile terminal of FIG. 10 includes one antenna, one scheduler, two RATs and two RF units respectively dedicated to the RATs. The scheduler assigns the antenna to the RF unit connected to the RAT 2 during the wireless communication suspension time band of the RAT 1.

Referring to FIG. 11, the mobile terminal includes m RF units, m antennas, one scheduler, and n RATs where n>m. Each RF unit has the antenna thereof. The scheduler assigns a couple of an RF unit and an antenna to each RAT. During the wireless communication suspension time band of an RAT 1, the scheduler assigns an RF unit 2 and an antenna connected to the RF unit 2 to an RATn measuring a reception level.

As described above, the mobile terminal may include the scheduler which assigns the wireless resource to another RAT regardless of the number of wireless resources including antennas, RF units and RATs if the scheduler has received a notification of the wireless communication suspension time band.

(2) Measurement Period Use Application:

In the mobile terminals of the embodiments, a wireless communication active RAT transfers information of a measurement period use application to the scheduler, and specifies the purpose of the wireless communication to be performed by a standby RAT. For example, to specify the measurement of the reception level as the measurement period use application, the scheduler assigns the wireless resource to only the RAT that has requested the wireless resource to be assigned thereto to measure the reception level.

The embodiments are not limited to this arrangement. The mobile terminal may not use the measurement period use application and may not limit the purpose of the wireless communication of the standby RAT. At least the scheduler of the mobile terminal may simply acquire the information of the wireless communication suspension time band of the wireless communication active RAT.

(3) Wireless Communication Method:

In accordance with the first through fourth embodiments, different communication methods are supported by the different RATs. The embodiments are not limited to this arrangement. For example, one wireless communication method may be supported by a plurality of RATs. An electronic circuit having the same function as the function of a plurality of RATs may be used. The electronic circuits may include an integrated circuit such as ASIC, or FPGA, or a CPU or a MPU.

The process steps of the mobile terminals of the above embodiments are not necessarily performed in the order specified here. A plurality of process steps may be concurrently performed. Steps S101-S104 of FIG. 4 may be concurrently performed. Steps S115-S118 and steps S126-S130 of FIG. 5 may be concurrently performed.

Figure 12:
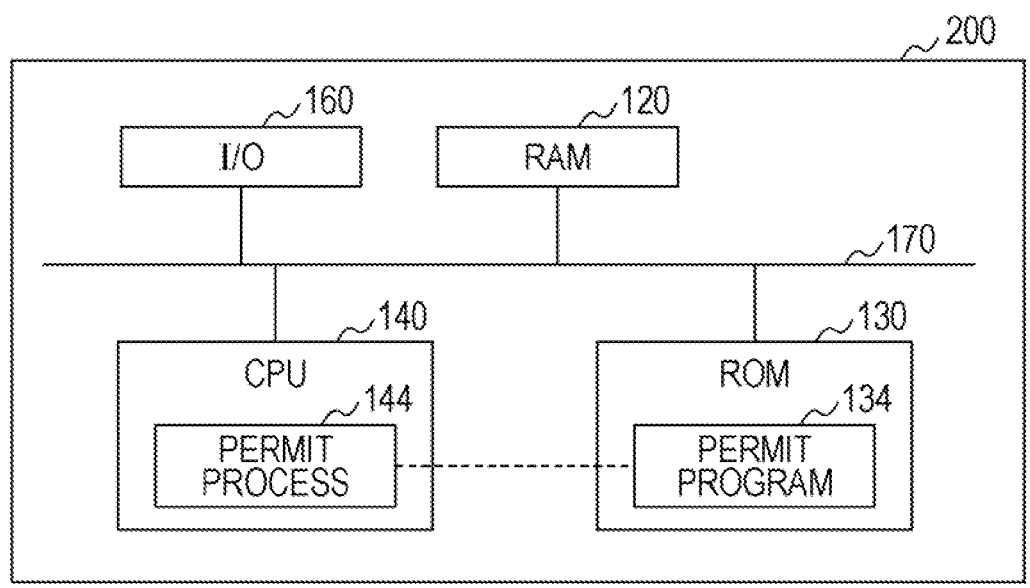
FIG. 12 illustrates a computer executing an assignment processing program.

(4) Program:

The mobile terminals of the second through fourth embodiments have a hardware structure to perform the variety of processes. The embodiments are not limited to this arrangement. A computer in the mobile terminal may perform the variety of processes by executing a program prepared beforehand. Described below is the computer executing a program having the same function as the function of the mobile terminal 10 of the first embodiment. FIG. 12 illustrates an example of a computer 200 executing an assignment processing program.

The computer 200 of FIG. 12 includes a random-access memory (RAM) 120, a read-only memory (ROM) 130, and a bus 170 connecting these elements. In the computer 200, a central processing unit (CPU) 140 is interconnected via the bus 170. The bus 170 also connects to an RF unit and an antenna as wireless resources via a connection terminal unit I/O 160.

The ROM 130 pre-stores a permit program 134. The CPU 140 reads the permit program 134 from the ROM 130, and executes the permit program 134. As illustrated in FIG. 12, the permit program 134 functions as a permit process 144. The permit process 144 has the same function as the function of the permit unit 4 of FIG. 1. The permit process 144 can be designed to have the same function as that of the scheduler 40 of the second embodiment, and the scheduler of the third and fourth embodiment.

The permit program of the embodiment may be implemented by causing the program to run on a computer such as a personal computer or a workstation. The program may be distributed via a network such as the Internet. The program may be stored on computer readable recording media including a hard disk, a flexible disk (FD), a compact read only memory (CD-ROM), a magneto-optical disk (MO), and a digital versatile disk (DVD). The program may be executed by the computer that reads the program from the recording medium.

The technique disclosed in the application increases expandability of a mobile terminal having a plurality of RATs.

As mentioned above, the present art has been specifically described for better understanding of the embodiments thereof and the above description does not limit other aspects of the art. Therefore, the present art can be altered and modified in a variety of ways without departing from the gist and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A mobile terminal comprising:
a communication circuit configured to perform wireless communication;
a plurality of modems coupled to the communication circuit, configured to perform modulation and demodulation in different communication methods, respectively; and
a processor coupled to the plurality of modems, configured to:
obtain, from a first modem in wireless communication via the communication circuit among the plurality of the modems, time information indicating a suspension of wireless communication in the first modem, and
enable a second modem among the plurality of modems to measure a reception level via the communication circuit while the first modem is suspending wireless communication via the communication circuit in accordance with the time information.

2. The mobile terminal of claim 1, wherein
the processor is configured to cancel enabling the second modem to use the communication circuit when the processor enables the first modem to use the communication circuit while the second modem is measuring the reception level.

3. The mobile terminal of claim 1, wherein
each of the plurality of modems has priority information for measuring the reception level.

4. The mobile terminal of claim 3, wherein
the processor is configured to enable each of the plurality of modems to use the communication circuit in accordance with the priority information.

5. A method of controlling a mobile terminal including a communication circuit and a plurality of modems, comprising:
obtaining, from a first modem in wireless communication via the communication circuit among the plurality of the modems, time information indicating a suspension of wireless communication in the first modem; and
enabling a second modem among the plurality of modems to measure a reception level via the communication circuit while the first modem is suspending wireless communication via the communication circuit in accordance with the time information.

6. The method of claim 5, further comprising:
canceling enabling the second modem to use the communication circuit when the enabling enables the first modem to use the communication circuit while the second modem is measuring the reception level.

7. The method of claim 5, wherein
each of the plurality of modems has priority information for measuring the reception level.

8. The method of claim 7, wherein
the enabling enables each of the plurality of modems to use the communication circuit in accordance with the priority information.

9. A control apparatus comprising:
a memory configured to store time information indicating a suspension of wireless communication in a first modem which is in wireless communication via a communication circuit among a plurality of the modems; and
a processor coupled to the memory, configured to permit a second modem among the plurality of modems to use the communication circuit to enable the second modem to measure a reception level via the communication circuit while the first modem is suspending wireless communication in accordance with the time information.

10. The control apparatus of claim 9, wherein
the processor is configured to cancel permitting the second modem to use the communication circuit when the processor enables the first modem to use the communication circuit while the second modem is measuring the reception level.

11. The control apparatus of claim 9, wherein
each of the plurality of modems has priority information for measuring the reception level.

12. The control apparatus of claim 11, wherein
the permit unit enables each of the plurality of modems to use the communication circuit in accordance with the priority information.

* * * * *